(12) United States Patent
Starsinic et al.

(10) Patent No.: US 12,244,490 B2
(45) Date of Patent: *Mar. 4, 2025

(54) MTC SERVICE SELECTION IN THE (S)GI-LAN

(71) Applicant: InterDigital Patent Holdings, Inc., Wilmington, DE (US)

(72) Inventors: Michael F. Starsinic, Newtown, PA (US); Ahmed Mohamed, Miramar, FL (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/181,812

(22) Filed: Feb. 22, 2021

(65) Prior Publication Data

US 2021/0176166 A1   Jun. 10, 2021

Related U.S. Application Data

(63) Continuation of application No. 15/748,829, filed as application No. PCT/US2016/044686 on Jul. 29, 2016, now Pat. No. 10,965,588.

(Continued)

(51) Int. Cl.
*H04L 45/30*     (2022.01)
*H04L 41/0893*   (2022.01)
(Continued)

(52) U.S. Cl.
CPC ........ *H04L 45/306* (2013.01); *H04L 41/0893* (2013.01); *H04L 45/566* (2013.01);
(Continued)

(58) Field of Classification Search
CPC . H04L 45/306; H04L 41/0893; H04L 45/566; H04W 4/70; H04W 88/16; H04W 28/0263; H04W 76/10; Y04S 40/00
See application file for complete search history.

(56) References Cited

U.S. PATENT DOCUMENTS 7,023,825 B1    4/2006 Haumont et al.
10,965,588 B2 *  3/2021 Starsinic ............... H04W 88/16
(Continued)

FOREIGN PATENT DOCUMENTS

CN    102273095 A       12/2011
GB      2411547 A   *    8/2005 .......... H04W 52/281
(Continued)

OTHER PUBLICATIONS

3rd Generation Partnership Project (3GPP), S2-151204 SA WG2 Meeting #18, Updates to Solution With policy Steering Interface, Ericsson et al., Apr. 13-17, 2015, 7 pages.

(Continued)

*Primary Examiner* — Steven Hieu D Nguyen
(74) *Attorney, Agent, or Firm* — Flaster Greenberg P.C.

(57) ABSTRACT

Various nodes in a 3GPP network, including a user equipment (UE), can be used to insert metadata in uplink traffic so that the network and/or an (S)Gi-LAN can make traffic steering decisions based on the metadata. For example, the UE can insert metadata into its uplink traffic so that the services in the (S)Gi-LAN can be better leveraged. Network nodes are able to insert metadata that relates directly to the UE and that relates to the operating conditions of the network nodes that the UE is using to send uplink data, so that the services in the (S)Gi-LAN can be better leveraged.

17 Claims, 20 Drawing Sheets

Related U.S. Application Data

(60) Provisional application No. 62/199,645, filed on Jul. 31, 2015.

(51) Int. Cl.

| | |
|---|---|
| *H04L 45/00* | (2022.01) |
| *H04L 45/302* | (2022.01) |
| *H04W 4/70* | (2018.01) |
| *H04W 88/16* | (2009.01) |
| *H04W 28/02* | (2009.01) |
| *H04W 76/10* | (2018.01) |

(52) U.S. Cl.
CPC ............ *H04W 4/70* (2018.02); *H04W 88/16* (2013.01); *H04W 28/0263* (2013.01); *H04W 76/10* (2018.02); *Y04S 40/00* (2013.01)

(56) References Cited

U.S. PATENT DOCUMENTS

| | | | |
|---|---|---|---|
| 2002/0032800 A1 | 3/2002 | Puuskari et al. | |
| 2008/0020775 A1* | 1/2008 | Willars | H04L 47/2491 455/445 |
| 2009/0046596 A1* | 2/2009 | Ewe | H04W 36/0033 370/252 |
| 2009/0080422 A1 | 3/2009 | Lee et al. | |
| 2010/0159919 A1* | 6/2010 | Wu | H04W 36/0066 455/424 |
| 2011/0035495 A1 | 2/2011 | Ekstroem et al. | |
| 2011/0267993 A1 | 11/2011 | Seo et al. | |
| 2012/0040687 A1* | 2/2012 | Siomina | G01S 5/019 455/422.1 |
| 2012/0188949 A1* | 7/2012 | Salkintzis | H04W 40/02 370/329 |
| 2012/0281540 A1 | 11/2012 | Khan et al. | |
| 2012/0302201 A1* | 11/2012 | Siomina | H04W 76/50 455/466 |
| 2013/0036215 A1 | 2/2013 | Kupinsky et al. | |
| 2014/0162642 A1* | 6/2014 | Kwon | H04W 8/24 455/435.1 |
| 2014/0169172 A1 | 6/2014 | Hu et al. | |
| 2014/0204927 A1* | 7/2014 | Horn | H04W 8/26 370/338 |
| 2014/0233380 A1 | 8/2014 | Kim et al. | |
| 2015/0264637 A1* | 9/2015 | Zaus | H04W 8/22 455/434 |
| 2015/0327269 A1* | 11/2015 | Kim | H04W 74/004 370/329 |
| 2015/0334027 A1* | 11/2015 | Bosch | H04L 45/38 370/230 |
| 2015/0334595 A1 | 11/2015 | Bosch et al. | |
| 2015/0341285 A1* | 11/2015 | Aysola | H04L 67/568 370/392 |
| 2015/0350988 A1* | 12/2015 | Himayat | H04W 36/22 370/331 |
| 2015/0351079 A1* | 12/2015 | Himayat | H04W 72/02 370/329 |
| 2015/0358884 A1* | 12/2015 | Nagasaka | H04L 5/0051 370/230 |
| 2016/0028640 A1 | 1/2016 | Zhang et al. | |
| 2016/0227467 A1* | 8/2016 | Tomici | H04W 48/06 |
| 2016/0295465 A1* | 10/2016 | Rommer | H04W 36/0022 |
| 2017/0250902 A1 | 8/2017 | Rasanen et al. | |
| 2017/0310585 A1* | 10/2017 | Kim | H04W 40/02 |
| 2017/0366960 A1* | 12/2017 | Kim | H04W 8/08 |
| 2018/0014346 A1* | 1/2018 | Gupta | H04W 28/18 |
| 2018/0248713 A1 | 8/2018 | Zanier et al. | |

FOREIGN PATENT DOCUMENTS

| | | |
|---|---|---|
| WO | WO 2010/049312 A1 | 5/2010 |
| WO | 2010/080966 A1 | 7/2010 |
| WO | 2013/126304 A2 | 8/2013 |
| WO | 2015/094296 A1 | 6/2015 |

OTHER PUBLICATIONS

3rd Generation Partnership Project (3GPP), S2-152042 SA WG2 Meeting #109, Aspects of Metadata Transfer and Application Reporting Support for TDF/PCEF, Allot Communications et al., May 25-29, 2015, 10 pages.

3rd Generation Partnership Project (3GPP), SP-140703, TSG SA Meeting #66, Updated WID for Flexible Mobile Service Steering (FMSS) Maui, Hawaii, USA, Dec. 10-12, 2014, 6 pages.

3rd Generation Partnership Project (3GPP), TR 23.718 V1.1.0, Technical Specification Group Services and System Aspects; Architecture Enhancement for Flexible Mobile Service Steering (Release 13), Jul. 2015, 38 pages.

3rd Generation Partnership Project (3GPP), TS 23.203 V13.4.0, Technical Specification Group Services and System Aspects; Policy and Charging Control Architecture (Release 13), Jun. 2015, 235 pages.

3rd Generation Partnership Project (3GPP), TS 24.008 V13.2.0, Technical Specification Group Core Network and Terminals; Mobile Radio Interface Layer 3 Specification; Core Network Protocols; Stage 3 (Release 13), Jun. 2015, 718 pages.

3rd Generation Partnership Project (3GPP), TS 29.212 V13.2.0, Technical Specification Group Core Network and Terminals; Policy and Charging Control (PCC); Reference Points (Release 13), Jun. 2015, 228 pages.

3rd Generation Partnership Project (3GPP), TS 29.213 V13.2.0, Technical Specification Group Core Network and Terminals; Policy and Charging Control Signalling Flows and Quality of Service (Qos) Parameter Mapping (Release 13), Jun. 2015, 210 pages.

3rd Generation Partnership Project (3GPP), TS 29.214 V13.2.0, Technical Specification Group Core Network and Terminals; Policy and Charging Control Over Rx Reference Point (Release 13), Jun. 2015, 65 pages.

3rd Generation Partnership Project (3GPP), TS 29.281 V12.1.0, Technical Specification Group Core Network and Terminals; General Packet Radio System (GPRS) Tunnelling Protocol User Plane (GTPv1-U) (Release 12), Dec. 2014, 27 pages.

Halpern et al., "Service Function Chaining (SFC) Architecture", The Internet Engineering Task Force (IETF), Oct. 2015, 32 pages.

Quinn et al., "Network Working Group, Internet-Draft, Network Service Header", The Internet Engineering Task Force (IETF), Mar. 21, 2016, 43 pages.

Xu et al., "Network Working Group, Internet-Draft, Service Function Chaining Using MPLS-SPRING", The Internet Engineering Task Force (IETF), Sep. 9, 2015, 7 pages.

W. Haeffner Vodafone, J. Napper Cisco Systems: "Service Function Chaining Use Cases in Mobile Networks" Draft-IETF-SFC-Use-Case-MOBILITY-04, JPN6019003064, Jul. 19, 2015, 51 pages.

* cited by examiner

MTC SERVICE SELECTION IN THE (S)GI-LAN

CROSS REFERENCE TO RELATED APPLICATIONS

This application is a continuation of U.S. patent application Ser. No. 15/748,829, filed Jan. 30, 2018, which is a National Stage Application filed under 35 U.S.C. § 371 of International Application No. PCT/US2016/044686 filed Jul. 29, 2016, which claims the benefit of U.S. Provisional Patent Application Ser. No. 62/199,645 filed Jul. 31, 2015, the disclosure of which is incorporated herein by reference in its entirety.

BACKGROUND

Referring to FIG. 1, the (S)Gi-LAN 102 refers to the packet data network (PDN) that is between the Internet 103 and the General Packet Radio Service (GPRS) Support Node (GGSN) or PDN Gateway (P-GW) (which can be referred to, for simplicity, collectively as a GGSN/P-GW 104 or P-GW/GGSN 104) of the Mobile Core network 101. The (S)Gi-LAN 102 is under control of the Mobile Network Operator (MNO). As shown in FIG. 1, when uplink data packets leave the (S)Gi-LAN 102, they are no longer under control of the MNO and the packets can be generally considered to have gone to the public Internet 103. The (S)Gi-LAN 102 may include Value Added Services (VASs). Examples of VASs include Network Address Translations (NATs), Firewalls, Video Compression, Data Compression, load balancers, HTTP Header Enrichment functions, Transmission Control Protocol (TCP) optimizers, etc. Generally, Deep Packet Inspection (DPI) techniques determine if each Value Added Service (VAS) should operate on a given data flow. Traffic may be routed to or from the (S)Gi-LAN 102 and Servers in the public Internet 103 such as a machine-to-machine (M2M) Server 106 for example.

The Internet Engineering Task Force (IETF) has developed an architecture framework for deploying VASs, or "Service Functions". Unless otherwise specified, the terms "Service Function" and "Value Added Service" may be used interchangeably. The architecture framework developed by the IETF is described in "IETF, Service Function Chaining Working Group, Internet Draft, Service Function Chaining (SFC) Architecture", which is incorporated by reference as if its contents are set forth herein. The framework allows traffic to be "steered" through only the services that apply to each individual flow, rather than requiring that all traffic be serially routed through all service functions. FIG. 2 is a diagram that shows example components of an example IETF SFC architecture framework 200. As shown, an example Service Classification Function (SCF) 202 accepts input packets. In a traditional (S)Gi-LAN, input packets may be IP packets from the P-GW/GGSN 104 or the Internet 103. The SCF 202 may encapsulate the input packets with another header, determine which Service Functions 204 that the packet should be routed through, determine the order that the packet should be routed through the service functions 204, and attach metadata to the packet to assist the service functions 204.

Referring to FIGS. 1 and 2, a Service Function Forwarder (SFF) 206 may accept packets from the SCF 202 and route the packets through the Service Functions 204. Once a packet has been routed through its service path, the SFF 206 may forward the packet to an egress node 208. The egress node 208 may remove any extra header information that was inserted by, for example, the SCF 202, SFF 206, or one of the service functions 204, and the egress node 208 may send the packet out of the (S)Gi-LAN 102 and into the P-GW/GGSN 104 or public Internet 104.

Referring also to FIGS. 3 and 4, an example Network Service Header 302 may contain metadata and service path information. The Network Services Header (NSH) was developed by the IETF's Service Function Chaining (SFC) Working Group (WG) and is defined in "IETF, Network Working Group, Internet Draft, Network Service Header", which is incorporated by reference as if its contents are set forth herein. The metadata and service path information contained in the NSH 302 may be used in the services plane to steer traffic through network services. FIG. 3 shows an example of where the NSH 302 sits relative to an example IP Datagram 304. FIG. 4 shows an example format 400 of the NSH 302, which includes a base header 402, a service path header 404, and context headers 406. The base header 402 may include, for example, a version field, a 'C' Bit to indicate that critical metadata is present in the NSH 302, a length field to indicate the total length of the NSH 302, a metadata Type field to indicate the format of the metadata, and a Next Protocol Field to indicate the format of the original payload. The service path header 404 may include, for example and without limitation, a Service Path ID that may be a 24-bit field that indicates which service path that should be selected for the packet, and a Service Index that is used to indicate the packet's location in the service path. The Context Headers 406 can be in various formats that depend on how the metadata Type field is set in the Base Header 402. The context header values can be a fixed length or they may contain variable length values. For the case of variable length headers, the IETF has described how to format the metadata and how to indicate the length of each value in the context header. When the metadata Type field indicates that the metadata is variable length, it may be formatted in accordance with the example format 500 shown in FIG. 5.

Referring to FIG. 5, a TLV Class field 502 describes the scope of the Type field 504. That is, the TLV Class field 502 may identify the vendor or standards body that allocated the type field 504. The Type field 504 indicates the type of information that is in the metadata. The most significant bit (MSB) of the type field 504 may be used to indicate whether or not it is mandatory for an entity that processes the NSH 302 to understand the metadata value. As shown, the R bits 506 may be reserved for future use, and the Len field 508 indicates the length of the metadata in a 4-byte word. In some cases, service aware nodes are permitted to perform header related actions, such as, for example, inserting the header, removing the header, selecting the service path, updating context headers, and selecting policy based on the header contents.

Turning now to application awareness in the Evolved Packet Core (EPC), 3GPP based networks generally provide IP bearer services to their subscribers with an agreed level of quality of service (QoS). The support given to external 3rd party applications for controlling IP flows is generally very limited. Third parties may be able to request that the EPC provide specific QoS treatment to particular IP flows. In some cases, the application awareness level in 3GPP networks is mainly controlled by the Policy Control and Charging (PCC) architecture 600 that is shown in FIG. 6.

The application awareness level in 3GPP networks is now summarized with reference to FIG. 6. 3GPP networks can be configured to detect certain application flows using Service Data Flow (SDF) templates. Service Data Flows (SDFs)

may be statically configured and may be associated with a PCC rule. SDFs are used to identify application flows for enforcing certain policies, charging, and applying QoS treatment to flows as per the PCC rule. The use of SDFs in the PCC architecture 600 is defined "3GPP TS 23.203, Policy and Charging Control Architecture", which is incorporated by reference as if its contents are set forth herein.

A Traffic Detection Function (TDF) 602 may be present in 3GPP networks to detect certain kinds of applications. The TDF 602 may employ DPI to detect applications. The TDF 602 may provide the SDF details of the identified applications to the Policy and Charging Rules Function (PCRF) 604. Alternatively, in cases in which SDF description is not possible, for example, the TDF 602 may perform gating, redirection, or Bandwidth limitation for the detected applications. The functionality of the TDF 602, procedures associated with the TDF 602, and the Sd interface 612 between the TDF 602 and the PCRF 604 are described in 3GPP TS 23.203, 3GPP TS 29.213, and 3GPP TS 29.212, which are each incorporated by reference as if their respective contents are set forth herein.

Still referring to FIG. 6, an Rx Interface 608 is used by Application Functions, for instance an Application Function 606, which require dynamic policy and/or charging control over the IP connectivity access network (CAN) user plane behavior. The AF 606 may communicate with the PCRF 604 to transfer dynamic session information that is required for PCRF decisions. The AF 606 may also communicate with the PCRF 604 to receive IP CAN specific information and notifications about IP CAN bearer level events. The AF 606 cannot delegate any application layer functions to the 3GPP core network (CN). The functionality of the AF 606, procedures associated with the AF 606, and the functions of the Rx interface 608 used to exchange application level session information between the PCRF 604 and the AF 606 is described 3GPP TS 23.203 and 3GPP TS 29.214.

The 3GPP SA2 Working Group currently has a work item called Flexible Mobile Service Steering (FMSS) (e.g., see 3GPP, SP-140703, WID for Flexible Mobile Service Steering (FMSS)). An objective of this work item is to define service requirements to enable the 3GPP Core Network to define and modify traffic steering policies that will be used to select required service enablers of the operator deployed (S)Gi-LAN. The most recent output of this work item is captured 3GPP TR 23.718, "Architecture Enhancements for Flexible Mobile Service Steering", which is incorporated by reference as if its contents are set forth herein. FIG. 7 is an example representation of how the 3GPP architecture that is proposed in reference 3GPP TR 23.718 would be applied to the architecture that is proposed by the IETF described above with reference to FIG. 2. 3GPP TR 23.718 proposes an St reference point 702 that allows the PCRF 604 to provide traffic steering policies to the SCF 202 in the (S)Gi-LAN 102. 3GPP TR 23.718 also proposes that the Sd interface 612 with the TDF 602 may be used to provide traffic steering polices to the TDF 602. The TDF 602 may then be used to apply packet markings (e.g., an NSH) to the traffic based on the detected application, user, etc. 3GPP TR 23.718 also proposes that the P-GW 104 apply packet markings (e.g., via an NSH) based on polices from the PCRF 604.

It is recognized herein that current approaches to traffic steering are inefficient, at least in part because the metadata that a PCRF knows, and the metadata that can be provided by a PCRF, is limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

As described herein, various nodes in a 3GPP network, including a user equipment (UE), can be used to insert metadata in an uplink message, which can also be referred to generally as uplink traffic, so that the network (e.g., a network function) and/or an (S)Gi-LAN can make traffic steering decisions based on the metadata. For example, the UE can insert metadata into its uplink traffic so that the services in the (S)Gi-LAN can be better leveraged. In one embodiment, network nodes are able to insert metadata that relates directly to the UE and that relates to the operating conditions of the network nodes that the UE are using to send uplink data, so that the services in the (S)Gi-LAN can be better leveraged.

In one embodiment, an apparatus comprises a processor, a memory, and communication circuitry. The apparatus is connected to a network via its communication circuitry, and the apparatus further comprises computer-executable instructions stored in the memory of the apparatus which, when executed by the processor of the apparatus, cause the apparatus to insert metadata in an uplink message. The metadata may be indicative of at least one of an active timer, a periodic TAU timer, a DRX cycle length, a radio access technology (RAT) type, a status, a sleep schedule, a battery level, a connection quality, a communication schedule, a caching policy, or a power restriction. The apparatus may send the uplink message with the metadata, such that the network (e.g., a network function) or an (S)Gi-LAN can steer the traffic (e.g., the uplink message) based on the metadata. The apparatus may comprise a network function, a user equipment, an eNodeB, a serving gateway (S-GW), or a packet data network (PDN) gateway (P-GW).

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION

Figure 1:
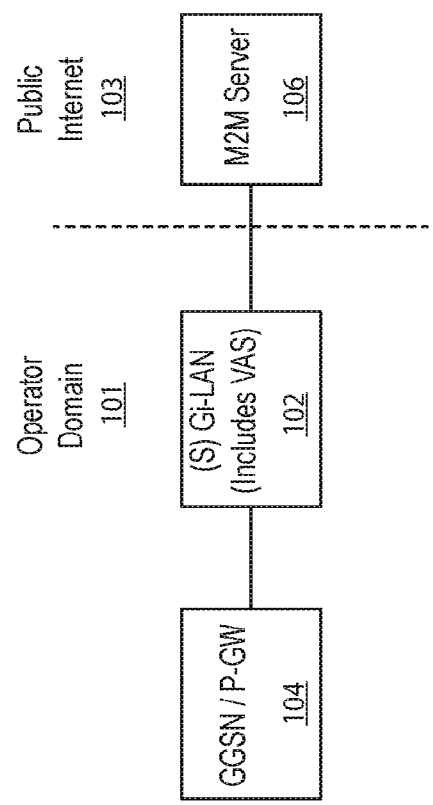
FIG. 1 is a block diagram that shows an example of where an (S)Gi-LAN resides relative to a mobile network operator (MNO) domain and the public Internet.
Figure 2:
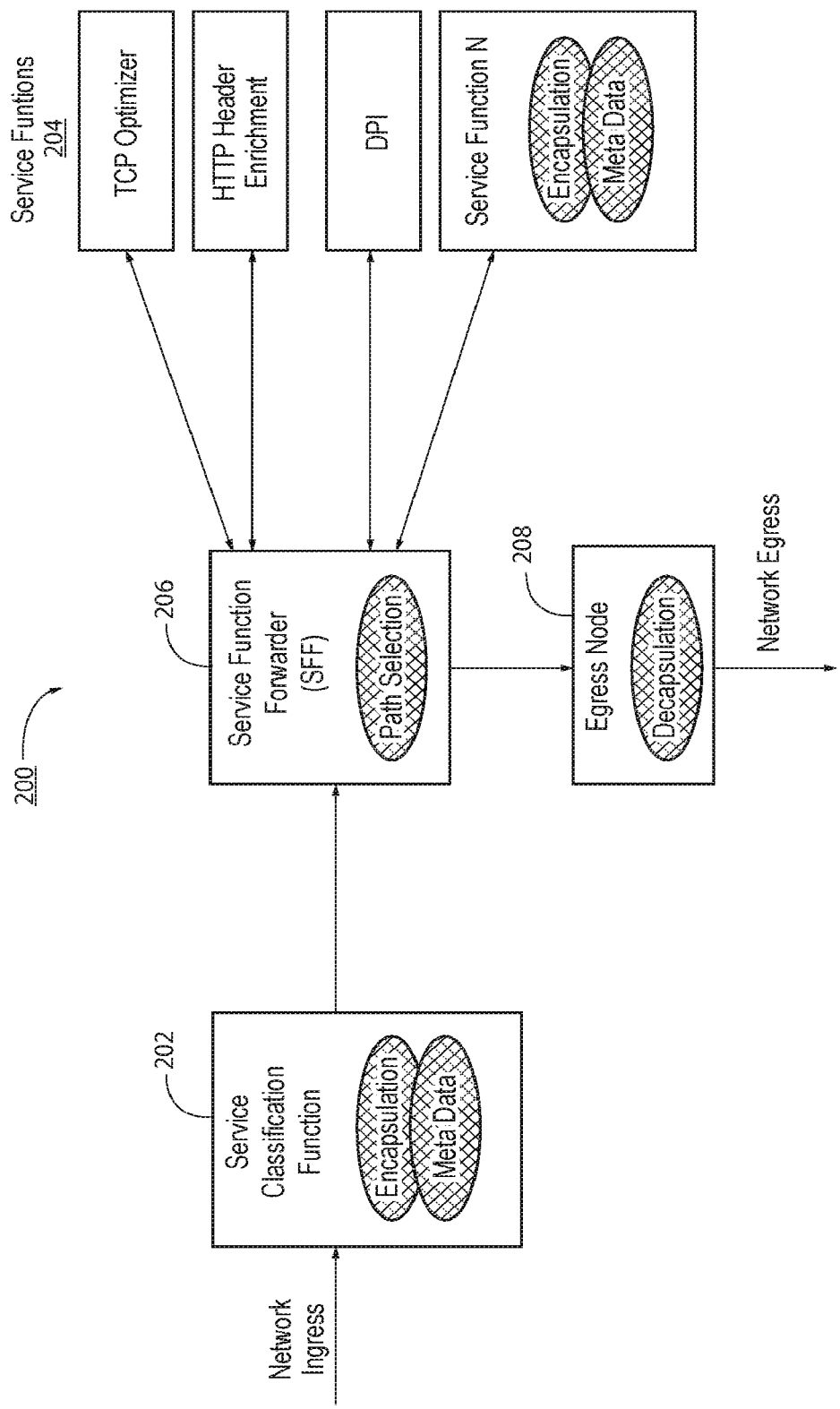
FIG. 2 is a block diagram that depicts an example of an IETF Service Function Chaining Architecture Framework.
Figure 3:
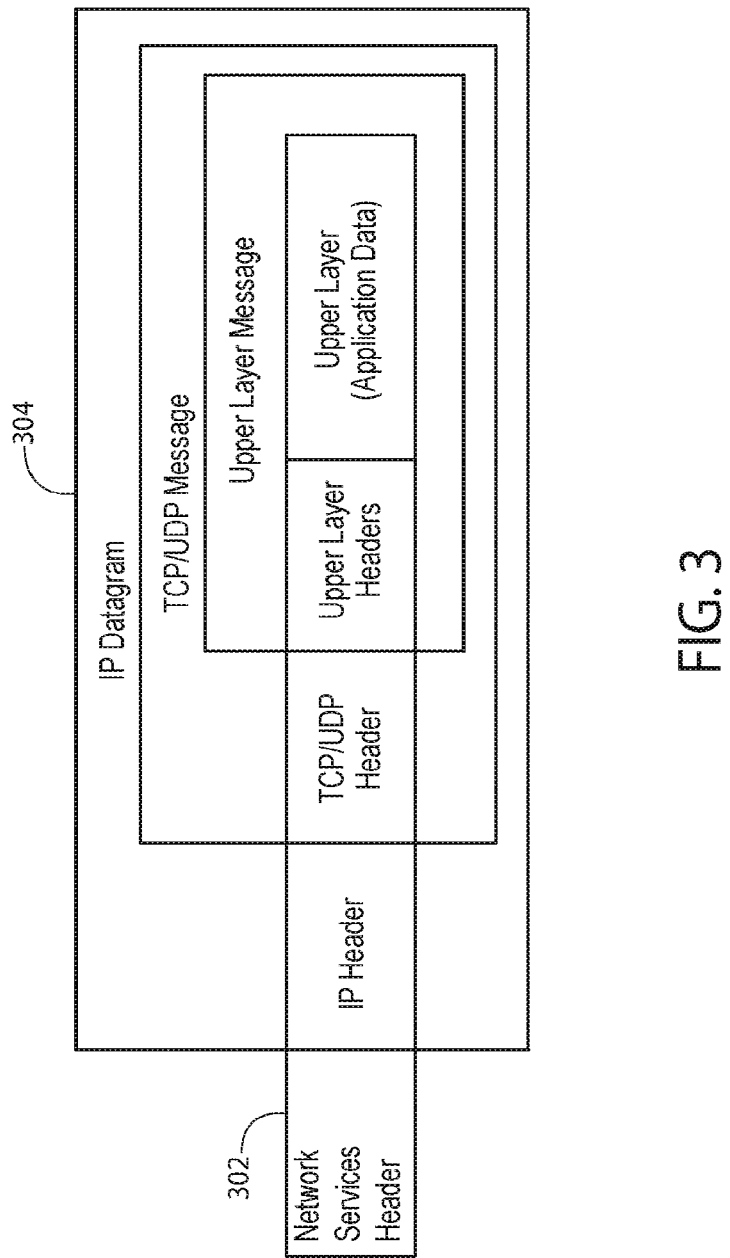
FIG. 3 depicts an example encapsulation of a Network Services Header (NSH)
Figure 4:
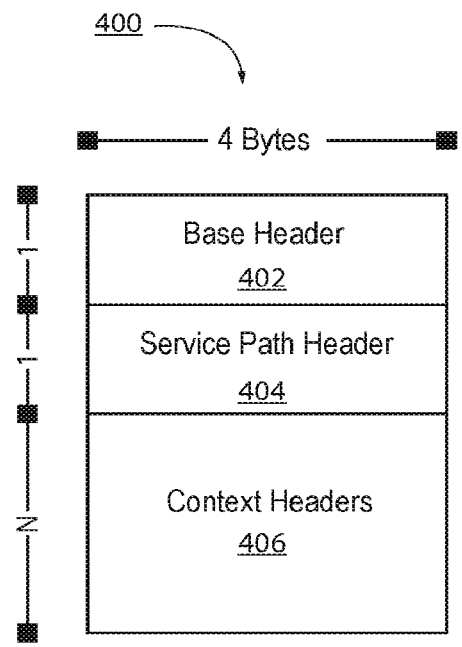
FIG. 4 depicts an example format of an NSH.
Figure 5:
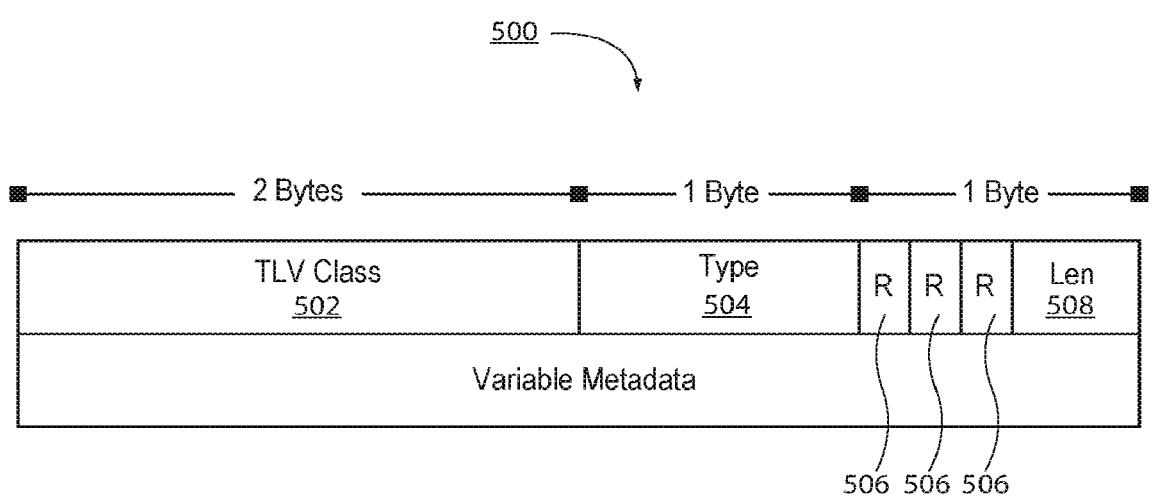
FIG. 5 depicts an example format of a context header of an NSH.
Figure 6:
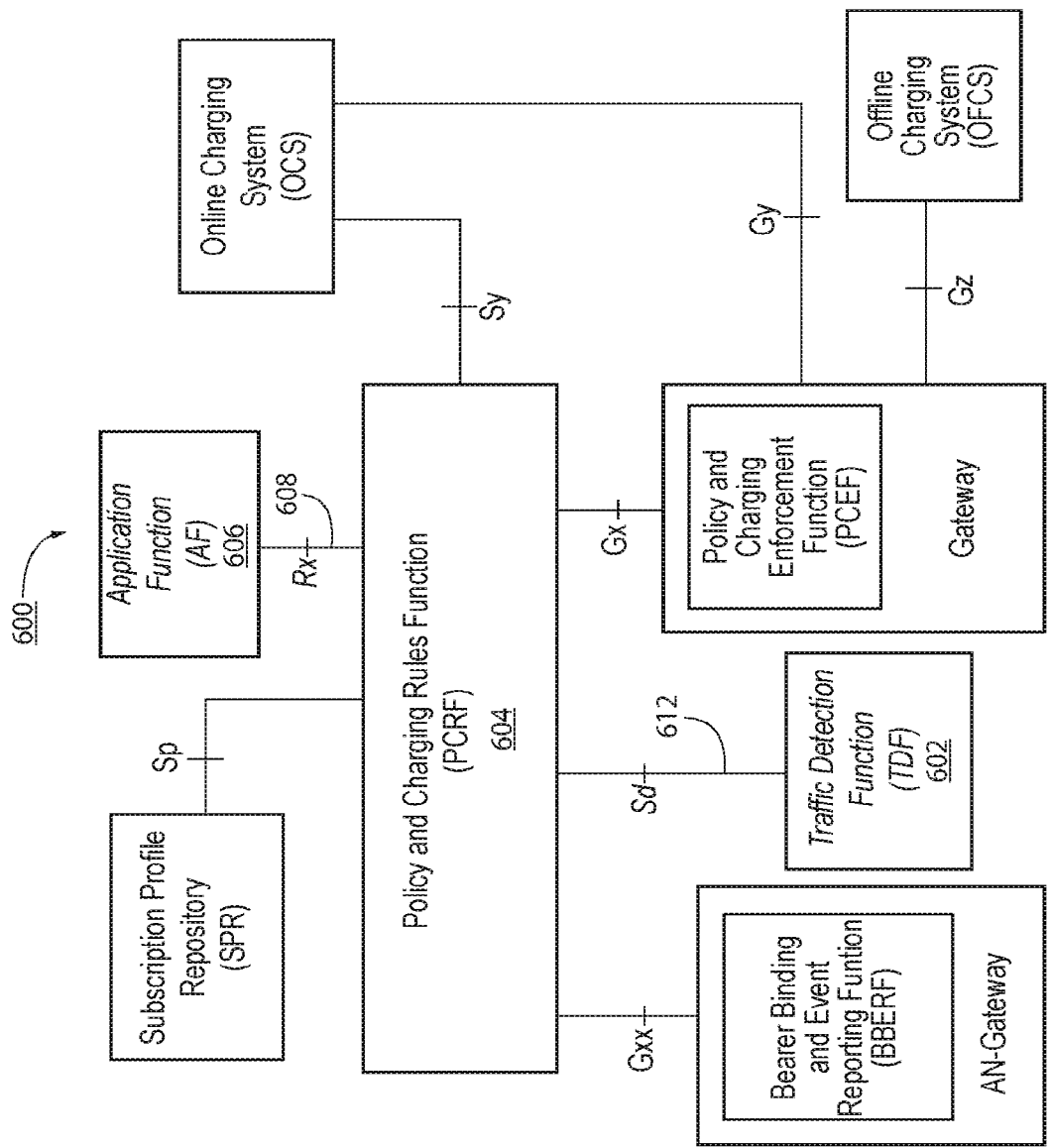
FIG. 6 is a block diagram of a Policy Control and Charging (PCC) architecture for 3GPP based networks.
Figure 7:
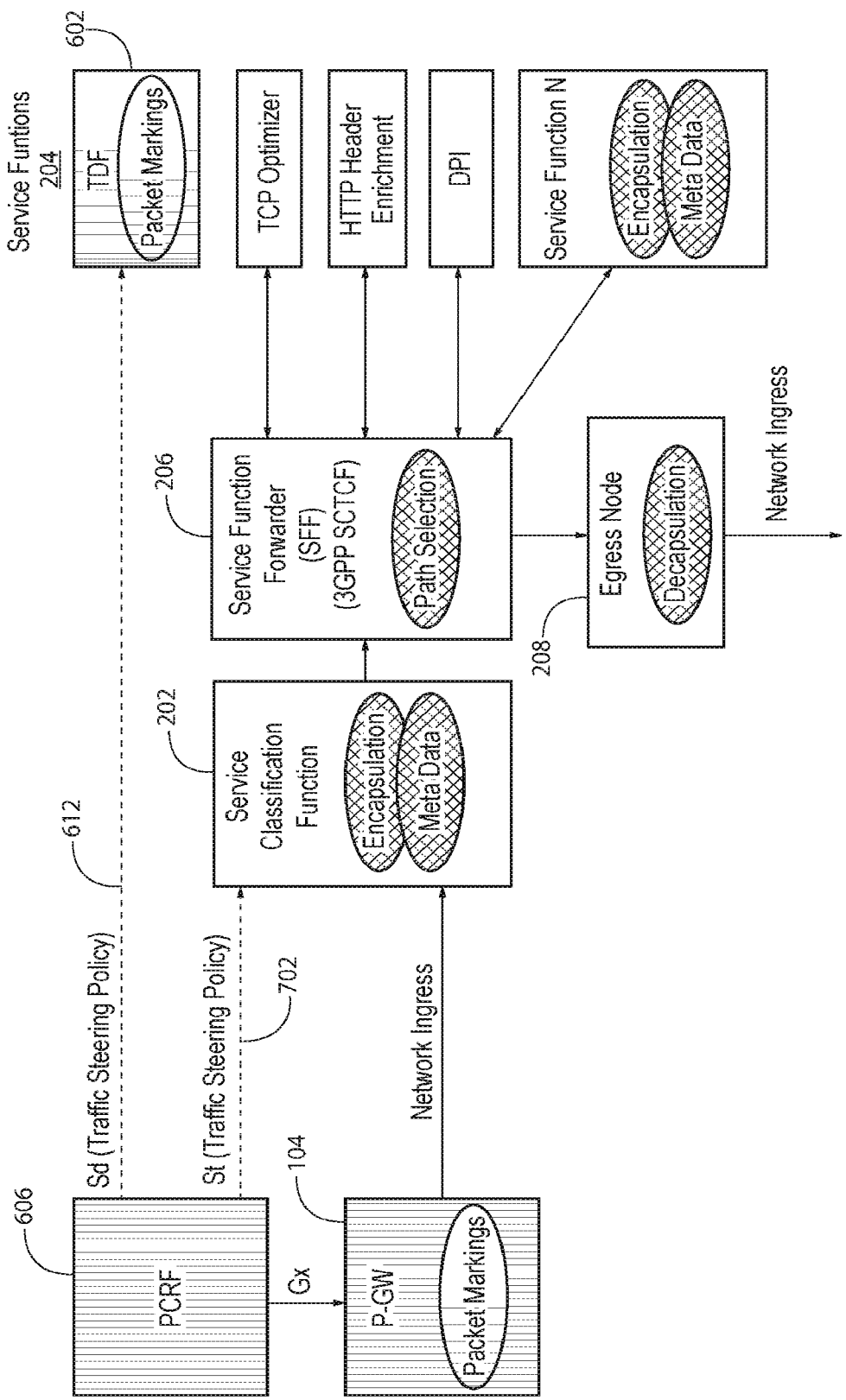
FIG. 7 is a block diagram that depicts an example of a 3GPP Flexible Mobile Service Steering (FMSS) architecture overlaid on the IETF Service Function Chaining (SFC) architecture.

As described herein, various nodes in a 3GPP network, including a user equipment (UE), can be used to insert metadata in uplink traffic so that the network and/or an (S)Gi-LAN can make traffic steering decisions based on the metadata. For example, the UE can insert metadata into its uplink traffic so that the services in the (S)Gi-LAN can be better leveraged. In one embodiment, network nodes are able to insert metadata that relates directly to the UE and that relates to the operating conditions of the network nodes that the UE is using to send uplink data, so that the services in the (S)Gi-LAN can be better leveraged. Uplink traffic may be tunneled through the eNodeB and S-GW via GTP, so embodiments are described herein that allow the metadata to be inserted inside of the GTP tunnel.

In order to offload some processing tasks from a given user equipment (UE), and to enable lower power and lower cost device deployments, Mobile Network Operators (MNOs) may offer Value Added Services (VASs) to cellular internet of things (IoT) IoT devices. VASs may give the IoT devices the ability to offload functionality from a given device to services in the (S)Gi-LAN. For example, functions such as security, data compression, data encryption, video processing, or the like can be performed by VASs in the (S)Gi-LAN instead of being performed using computational resources on a given cellular IoT device.

Example use cases are presented below to describe concepts disclosed herein, though it will be understood that the uses cases are presented by way of example and without limitation. By way of an example use case, when a user attempts to download a video file using a given UE, a Value Added Service (VAS) in the (S)Gi-LAN may use deep packet inspection (DPI) to detect that the user is requesting to download a video. Once the (S)Gi-LAN is aware that the UE has requested the video download, it is recognized herein that it might be beneficial for the (S)Gi-LAN to know the user's context. For example, the (S)Gi-LAN may benefit from knowing if the user's network is congested, the battery of the UE is low, the UE is plugged in, etc. The (S)Gi-LAN or Network Functions may use this context information and other context information to determine if the downlink data should be routed through a VAS that will, for example, compress the video. Additionally, or alternatively, for example, the (S)Gi-LAN or Network Functions may use this context information to steer downlink traffic toward a particular access network, or to switch traffic associated with particular access flow(s) toward a particular access network.

By way of another example use case, the (S)Gi-LAN may wish to know the internet addresses to which a UE is sending data to so that it can decide if traffic should be blocked or routed through a Network Address Translation (NAT) function. In yet another example, the (S)Gi-LAN may wish to know if a UE, which may also be referred to herein as a user, is transitioning between long sleep and awake cycles (e.g., DRX or PSM). For example, if a user is periodically sleeping for relatively long periods of time, uplink data from the user may be cached in the (S)Gi-LAN. When future downlink requests for user data are received, the (S)Gi-LAN may respond with cached data instead of rejecting the request or providing a delayed response.

It is recognized herein that when the (S)Gi-LAN becomes more aware of the user's context, it can better decide which services to route traffic through and which services to enable. If user context is not known to the (S)Gi-LAN, then traffic may need to be routed through all services, and each service may need to independently decide if it should operate on the data. Furthermore, when the MNO offers VASs, in some cases, it is inefficient to route all device traffic through all VASs. The VASs that should be applied to each portion of network traffic may be dependent on various information, such as for example, context information associated with the user (user context), the application associated with the traffic, and context information associated with the device (device context).

As described above, 3GPP interfaces (e.g., St and Sd interfaces) allow the Mobile Core Network (e.g., PCRF) to send traffic steering policies to the (S)Gi-LAN so that traffic steering decisions can be made that are based on the user and associated application. 3GPP TR 23.718 states that metadata such as UE identity, location, and radio access technology (RAT) type can be provided to traffic steering functions in the (S)Gi-LAN via a control plane and the St interface between the PCRF and (S)Gi-LAN. It is recognized herein, however, that the amount of metadata that can be provided by the PCRF is very limited. It is further recognized herein that the PCRF's knowledge of user context is often limited compared to the context that can be derived by network nodes (e.g., eNodeB, S-GW, MME) that are closer to a given UE, and by the UE itself. It is also recognized herein that the approach described in 3GPP TR 23.718 requires a control plane interface into the (S)Gi-LAN, and a function in the (S)Gi-LAN to disseminate the metadata.

In accordance with one embodiment, uplink IP packets from a UE can be wrapped in an NSH prior to reaching the (S)Gi-LAN, and the UE, eNodeB, and mobile core network can insert metadata into the NSH, for example, so that a service function chain can be more intelligently selected when the traffic reaches the (S)Gi-LAN. As used herein, unless otherwise specified, the terms, "Service Function" and "Value Added Service" are interchangeable without limitation.

Figure 8:
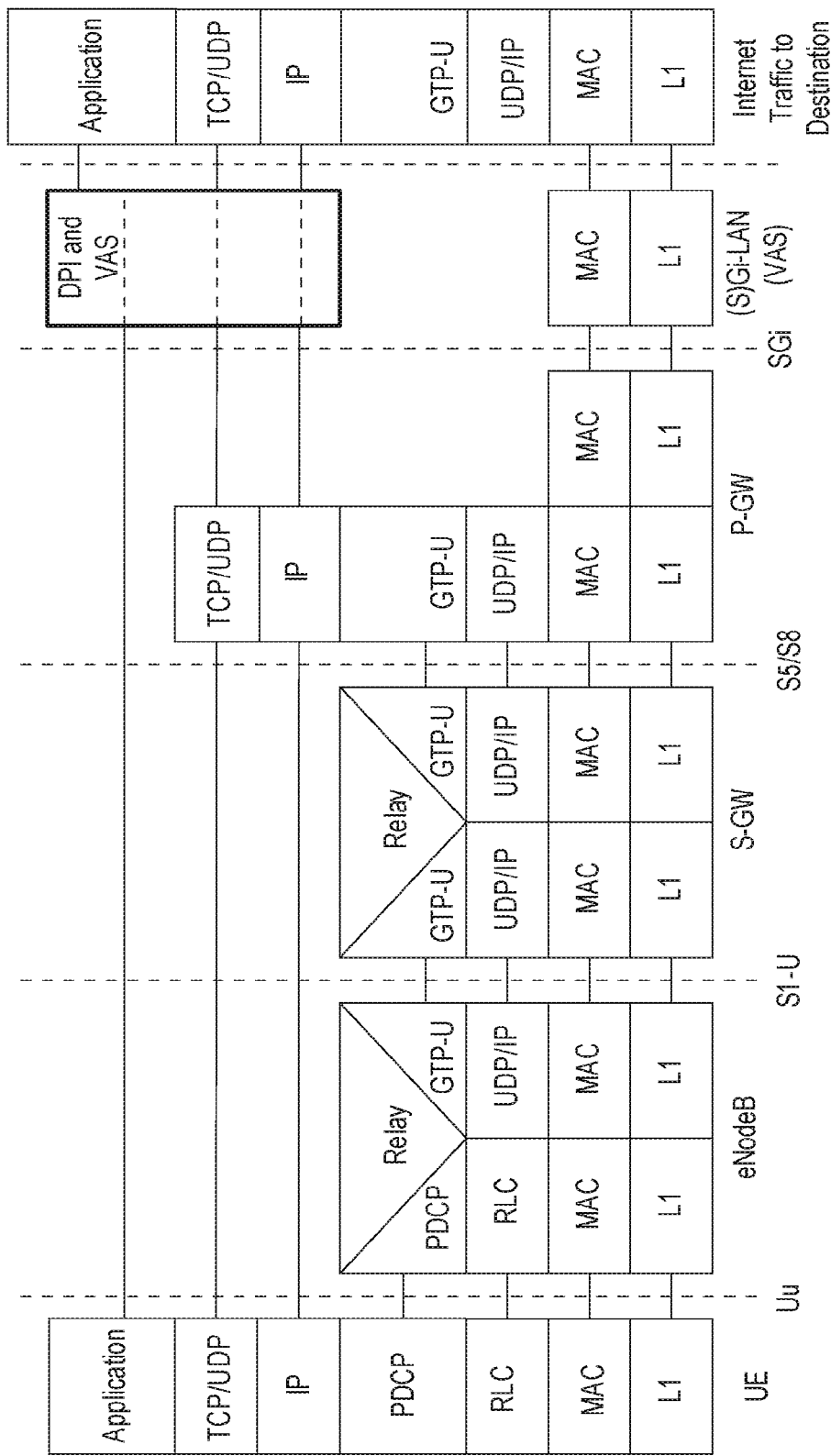
FIG. 8 shows an example of user plane protocol stacks for various network nodes.

Referring now to FIG. 8, existing user plane protocol stacks are shown between a UE, a (S)Gi-LAN, and a destination server with which the UE is in communication. As shown, the (S)Gi-LAN can apply Deep Packet Inspection (DPI) and Value Added Services (VASs) to the traffic. For example, DPI can be used to detect that a particular Application or Transport protocol is being used to communicate with a server at a particular IP Address. Based on the result of the DPI, a VAS may be applied to Application Data. Example VASs include, video compression, encryption, etc. Thus, the value added services in the (S)Gi-LAN may change, for example, the application data or the IP addresses of the destination or source.

Figure 9:
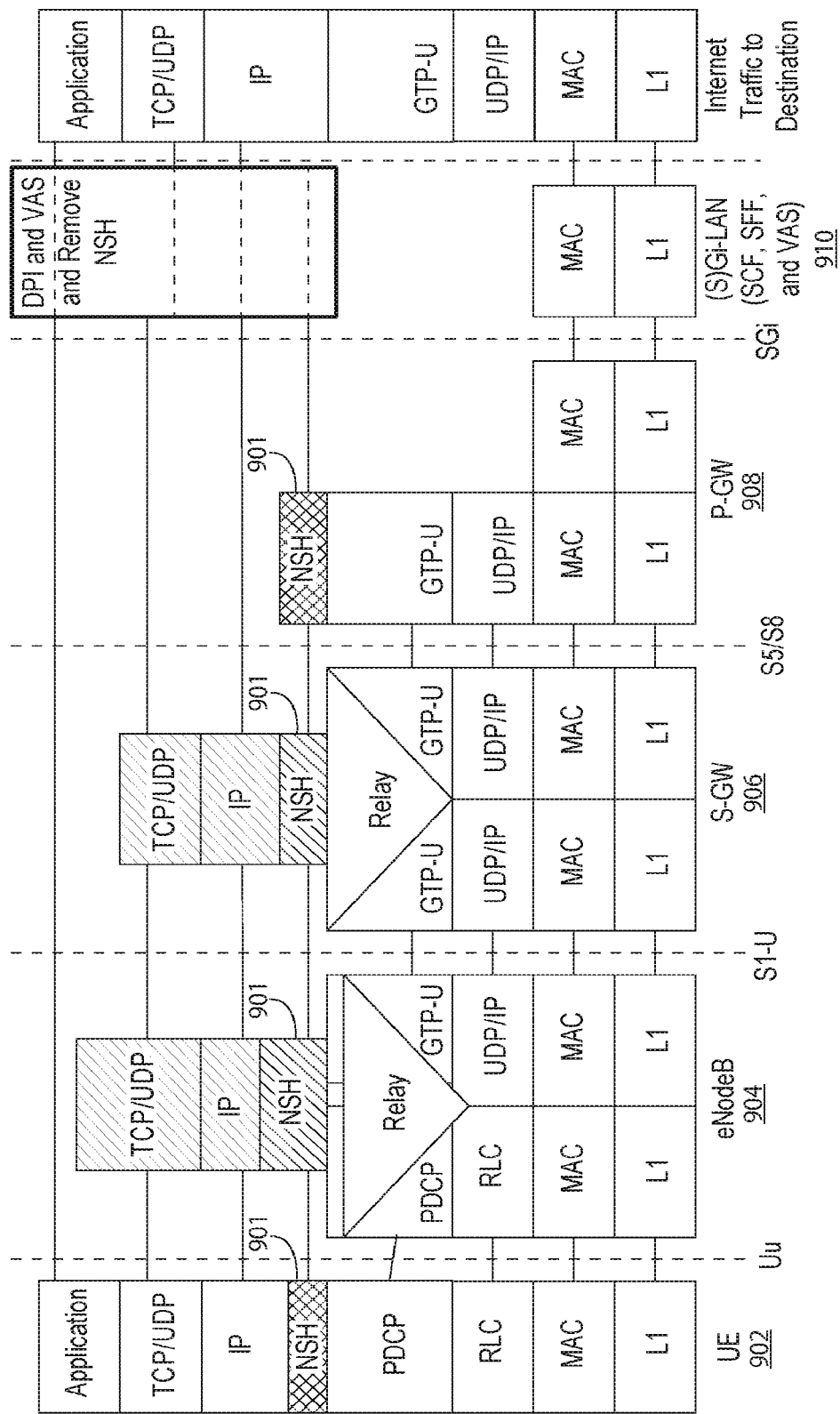
FIG. 9 shows an example of user plane protocol stacks for various network nodes in accordance with an example embodiment.

Referring also to FIG. 9, the user plane protocol stacks are updated in accordance with an example embodiment. As shown, various network nodes can insert an NSH and/or add metadata to an NSH, for instance an NSH 901. As shown, the example network nodes that can insert the NSH 901 or add metadata to an NSH include a UE 902, an eNodeB 904, a Serving Gateway (S-GW) 906, and a Packet Data Network (PDN) Gateway (P-GW) 908. Furthermore, any entity or node that in the processing chain after an NSH has been inserted may add additional metadata to the NSH, in accordance with an example embodiment. In some cases, the eNodeB 904 and the S-GW 906 will not insert an NSH or add to an NSH.

Still referring to FIG. 9, an example (S)Gi-LAN 910 can apply Deep Packet Inspection and Value Added Services to the traffic. The Value Added Services that are applied to the traffic may be determined based on the results of DPI and the content of the NSH. For example, metadata in the NSH may indicate that the traffic comes from a congested network node (e.g., the P-GW 908). Based on the congestion situation, the application request from the UE 902 may be modified. For example, if the original request is for a video download, the request may be modified such that a lower quality version of the video is requested as compared to the original request.

In an example embodiment, an NSH can be inserted at a UE, for instance the UE 902. Based on provisioned policies, the PCRF may know that certain traffic flows require steering in the (S)Gi-LAN and that steering of the flows may be more efficient if certain metadata was attached to the flow. The PCRF may use the Gx interface to indicate to the P-GW which flows would benefit from having metadata associated with them.

In one embodiment, the P-GW may use an EPC Session Management message (e.g., Activate Dedicated EPS Bearer Context Accept, Activate Default EPS Bearer Context Accept, Modify EPS Bearer Context Request, etc.) to notify the UE of which flows would benefit from having metadata embedded in them. Specifically, the TFT or Protocol Configuration Options information elements of the EPC Session Management messages can be modified to allow the network to indicate to the UE which flows would benefit from added metadata. This is further described below.

Figure 10:
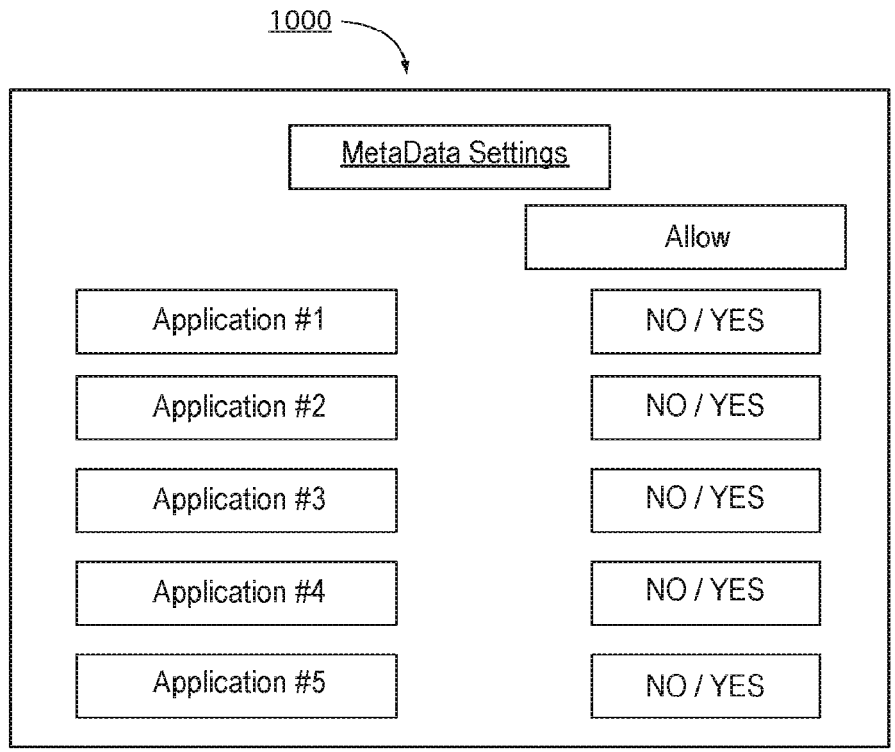
FIG. 10 is an example graphical user interface (GUI) that may be rendered by a user equipment (UE) in accordance with an example embodiment.
Figure 11:
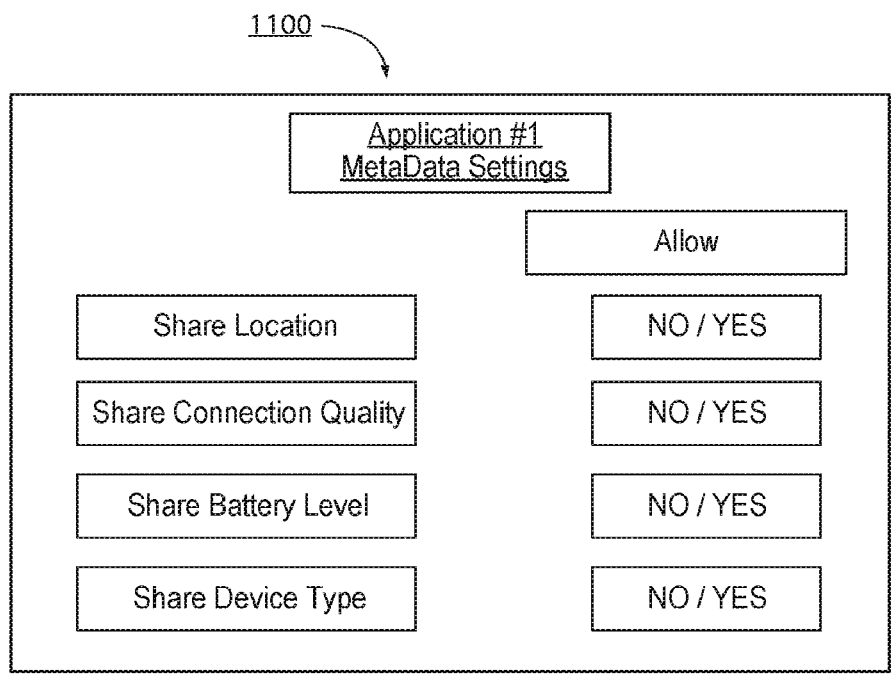
FIG. 11 is another example GUI that may be rendered by a UE in accordance with another example embodiment.

Referring now to FIG. 10, an example graphical user interface (GUI) 1000 may be rendered by a UE to provide a user with a means for configuring the UE so that metadata and/or an NSH is inserted in data traffic that originates from certain applications. Alternatively, or additionally, the GUI may allow the user to indicate if certain applications are allowed to insert metadata or an NSH. In some cases, applications may individually generate a pop up message asking the user if the application is permitted to insert metadata or an NSH in its data flow. By way of example, application XYZ may generate a pop up message that says "Application XYZ would like to optimize performance by sending Metadata to Application XYZ's Server, Tap or Click 'OK' to allow this or Tap or Click 'Cancel' to disallow this." The example GUI 1000 depicts an example interface that can be rendered by a UE so that user can configure whether each individual application is allowed to insert metadata or an NSH into an application flow. It will be understood that the GUI 1000 may expanded to allow the user to select the type of metadata that can be inserted in each flow. For example, when an application is allowed to send metadata, another GUI window, such as an example GUI window 1100 depicted in FIG. 11 for example, may be presented to the user. The GUI window 1100 may allow the user to further select which types of metadata can be inserted in the NSH. Thus, a UE may be configured via a graphical user interface, for instance the GUI 1000 and the GUI window 1100, to allow certain applications to send metadata to the network or to allow certain types of metadata to be sent to the network. It will be understood that the example user interfaces can be used to monitor and control alternative parameters as desired. It will further be understood that GUIs can provide a user with various information in which the user is interested via a variety of charts or alternative visual depictions.

Figure 12:
FIG. 12 is a packet filter list in accordance with an example embodiment.

In accordance with an example embodiment, a Traffic Flow Template (TFT) information element of an EPS session management message is modified so that the network can indicate to a UE which flows would benefit from additional metadata. The existing TFT information element is defined in section 10.5.6.12 of 3GPP TS 24.008, which is incorporated by reference as if its contents are set forth herein. FIG. 12 shows a modified example of the packet filter list that is shown in FIG. 10.5.144b of reference 3GPP TS 24.008. As shown, in accordance with the illustrated example, the 7th bit of the first byte in each packet filter description is updated to allow the network to indicate to the UE if the associated data flow would benefit from added metadata. In one example, a 1 in the 7th bit of the first byte in each packet filter may indicate to the UE that the associated data flow would benefit from added metadata.

Alternatively, in accordance with another embodiment, the "protocol configuration options" information element of an EPS session management message may be modified so that the network can indicate to the UE which flows would benefit from added metadata. The protocol configuration options information element is defined in section 10.5.6.3 of 3GPP TS 24.008. Specifically, in one example, the definition of the "additional parameter list" octets of the "protocol configuration options" information element is updated to allow the network to indicate to the UE if the flows associated with the PDN connection would benefit from added metadata. Similarly, information can be used to indicate to the UE what specific types of metadata (e.g., location, battery level, etc.) should be provided to the network.

As shown in FIG. 9, an NSH 901 may be inserted at the UE 902. In some cases, when a packet is delivered to the UE's operating system (OS) for delivery, the OS may insert the NSH 901. Whether or not the UE 902 inserts the NSH 901 may be based on the GUI settings described above with reference to FIGS. 10 and 11, or may be based on an indication from the network described herein. Alternatively, the UE Application may insert the NSH 901 and the UE OS may add metadata to the NSH 901. Examples of metadata include, without limitation, location, an indication of battery level, an indication of connection quality, an indication of perceived data rate, an indication of mobility, etc. In some cases, the presence of the NSH 901 in the IP packet may serve as an indication to the UE's OS that metadata should be added.

As mentioned above, the format of a Network Services Header (NSH), for instance the NSH 901, is described in "IEFT, Network Working Group, Internet-Draft, Network Service Header." In one embodiment, the UE 902 populates the Service Path ID (SPI) field of the NSH with a value (which can be referred to as a place holder or pre-defined/ reserved value) to indicate that the UE 902 is inserting metadata. Later in the processing chain, a node (e.g., the P-GW 908 or a function in the (S)Gi-LAN 910) selects the Service Path ID (SPI) based on the metadata and network policies. In some cases, the UE may be operator owned or part of the network infrastructure. For example, the UE may be acting as a gateway or relay. In this scenario, the UE OS may populate the SPI field so that the traffic may be steered through a particular service (e.g., a particular security or charging service) in the (S)Gi-LAN 910.

The UE 902 may insert various types of metadata values in the NSH 901, such as, for example and without limitation:
Active Timer (T3324, described in 3GPP TS 24.008)
Periodic TAU Timer (T3412, described in 3GPP TS 24.008)
DRX Cycle Length
RAT Type (e.g., E-UTRAN, UTRAN, GERAN, WLAN)
Status Indicators In some cases, status indicators may be a set of single bit values that are used to indicate various parameters associated with the UE. Status indicators may include the following, presented by way of example and without limitation:
The UE's "Low Power Preference" indicator, which is an indication that the UE prefers to operate in a low power mode.
The UE's Stationary Indicator, which is an indication that the UE does not anticipate that it will be mobile.
The UE's "Low Access Priority" indicator, which is a 3GPP indicator that is used to indicate that the associated PDN connection is a low access priority.
An Extended DRX Enabled Indicator, which is an indication that the UE is using Extended DRX
A Remote Application Indicator that shows that the traffic is generated by an application that is not hosted on the same physical device as the UE. For example, the traffic may come from a Bluetooth device that connects to the internet via the UE, as further described below.
PSM Enabled Indicator, which is an indication that the UE is using PSM.
A Caching Permitted Indicator, which may be bit that, when the bit is set, indicates to the Steering functions in the (S)Gi-LAN that the payload may be cached.

In one embodiment, a TLV Class value in the NSH 901 is for 3GPP metadata. Additionally, different type values may be used to indicate which 3GPP node inserted the metadata (e.g., UE, S-GW, P-GW, eNodeB, Service Function, etc.). For example, a Type value in the NSH header may be reserved for each of the metadata types listed above.

In some cases, the Remote Application Indicator may be used to steer traffic through particular NAT functions or firewall services. For example, traffic from remote applications may be steered through a NAT function that assigns a different IP address to the remote traffic as compared to traffic that is generated by applications that are hosted on the UE platform. Thus, for example, traffic from a Bluetooth medical device may be assigned a different IP address than traffic from the UE's web browser. The Remote Application Indicator may also be used to steer the traffic through a charging, or sponsoring, service that inspects the traffic and determines if the UE should be charged for the traffic. By way of example, when the UE acts as a gateway for devices that are communicating with a particular Medical Diagnostic Server, the MNO may choose to not charge the UE for the associated traffic, and the Remote Application Indicator may allow for that decision.

In an example embodiment, the Operations, Administration, and Maintenance (OAM) system allows the network operator to configure the eNodeB 904 to handle Network Service Headers (NSHs). For example, the OAM system may use protocols such as SNMP or TR-69 to configure the eNodeB 904 to inspect traffic from selected users, or that is associated with selected flows, for an NSH and to add metadata to the NSH if the NSH is present in the inspected traffic. Alternatively, the OAM system may use protocols such as SNMP or TR-69 to configure the eNodeB 904 to inspect traffic from selected users or from selected flows, and add an NSH and metadata if at least one of an NSH or metadata is not present in the inspected traffic. The OAM system may also use protocols such as SNMP or TR-69 to configure the eNodeB 904 to inspect NAS messaging from selected users, or selected flows, to detect if an NSH should be added to traffic from particular users or flows. The eNodeB 904 may inspect traffic NAS Session Management signaling to/from the UE 902 to determine if the network has requested that the UE 902 insert an NSH.

With respect to inserting metadata at an eNodeB, referring to FIG. 9, the eNodeB 904 receives IP packets from the UE 902 and uses GTP-U to tunnel the data to the S-GW 906. The GTP-U payload is referred to as a T-PDU. The eNodeB 904 may append the NSH 901 to the front of the T-PDU. If the UE 902 already appended to the NSH 901 to the IP packet as described above, the eNodeB 904 may update the NSH 901 by adding metadata. The eNodeB 904 may insert various metadata such as, for example, an RAT type (e.g., E-UTRAN, UTRAN, GERAN, WLAN) and status indicators. In some cases, status indicators may be a set of single bit values that are used to indicate various parameters associated with the UE. Status indicators that are inserted by the eNodeB 904 may include the following, presented by way of example and without limitation:
The UE's "Low Power Preference" indicator, which is an indication that the UE prefers to operate in a low power mode.
The UE's Stationary Indicator, which is an indication that the UE does not anticipate that it will be mobile.
The UE's "Low Access Priority" indicator, which is a 3GPP indicator that is used to indicate that the associated PDN connection is a low access priority.
An Extended DRX Enabled Indicator, which is an indication that the UE is using Extended DRX
A Remote Application Indicator that shows that the traffic is generated by an application that is not hosted on the same physical device as the UE. For example, the traffic may come from a Bluetooth device that connects to the internet via the UE, as further described below.

PSM Enabled Indicator, which is an indication that the UE is using power savings mode (PSM).

eNodeB Congestion Indicator, which is an indication that the eNodeB is experiencing congestion. The OAM system may inform the eNodeB of the congestion situation.

In some cases, if the eNodeB adds metadata to the NSH, then the eNodeB may adjust the Len field of the NSH base header accordingly. Alternatively, the eNodeB may add the metadata to the GTP-U header. For example, the Private Extension field of the GTP header may be used to append the metadata to the traffic. The Private Extension information element is described in section 8.6 of 3GPP TS 29.281, which is incorporated by reference as if its contents are set forth herein.

In accordance with an example embodiment, the OAM system allows the network operator to configure the S-GW 906 to handle NSHs. For example, the S-GW 906 may be configured to inspect traffic from selected users (or from selected flows) for an NSH, and to add metadata to the NSH if the NSH is present in the inspected traffic. Alternatively, the S-GW 906 may be configured to inspect traffic from selected users (or selected flows) and add an NSH and metadata if at least one of the NSH or metadata are not present in the inspected traffic. The S-GW 906 may be configured to inspect Session Management messaging from selected users (or selected flows) to detect if an NSH should be added to traffic from particular users or flows. In some cases, a MME may inform the S-GW 906 which users or flows require an NSH. For example, the MME may learn from the UE's subscription information that traffic associated with the user, associated with particular user flows, or associated with a particular APN requires an NSH. The MME may learn from NAS Session Management Signaling that the traffic associated with the user, a PDN connection, or a particular flow requires NSH. The MME may inform the S-GW 906, via the S11 interface, that the S-GW 906 should insert the NSH 901 or metadata into a particular flow or PDN connection. In some cases, the S-GW 906 may learn from the eNodeB 904, via an indication in the GTP-U header, that metadata needs to be added to the GTP-U header.

The S-GW 906 receives T-PDU's from the eNodeB 904 and uses GTP-U to tunnel the T-PDU's to the P-GW 908. In an example embodiment, the S-GW 906 may append the NSH 901 to the front of the T-PDU. In some cases, if the eNodeB 904 or the UE 902 already appended the NSH 901 to the IP packet as described above, then the S-GW 906 may update the NSH 901 by adding metadata to the NSH 901. The S-GW 906 may insert various types of metadata values in the NSH 901, such as, for example and without limitation:

Active Timer (T3324), which may be obtained from the MME via S11 signaling

Periodic TAU Timer (T3412), which may be obtained from the MME via S11 signaling DRX Cycle Length, which may be obtained from the MME via S11 signaling RAT Type (e.g., E-UTRAN, UTRAN, GERAN, WLAN), which may be obtained from the MME via S11 signaling Status Indicators In some cases, status indicators may be a set of single bit values that are used to indicate various parameters associated with the UE. The S-GW 906 may obtain status indicator information from the MME via S11 signaling. Status indicators that are inserted by the S-GW 906 may include the following, presented by way of example and without limitation:

The UE's "Low Power Preference" indicator, which is an indication that the UE prefers to operate in a low power mode.

The UE's Stationary Indicator, which is an indication that the UE does not anticipate that it will be mobile.

The UE's "Low Access Priority" indicator, which is a 3GPP indicator that is used to indicate that the associated PDN connection is a low access priority.

An Extended DRX Enabled Indicator, which is an indication that the UE is using Extended DRX.

PSM Enabled Indicator, which is an indication that the UE is using power savings mode (PSM).

S-GW or MME Congestion Indicator, which is an indication that the S-GW 906 or MME is experiencing congestion. The MME may indicate the congestion to the S-GW 906 via the S11 interface or the OAM system may inform the S-GW 906 of the congestion situation.

In some cases, if the S-GW 906 adds metadata to the NSH 901, then the S-GW 906 adjusts the Len field of the NSH base header accordingly. Alternatively, the S-GW may add the metadata to the GTP-U header. For example, the Private Extension field of the GTP header may be used to append the metadata to the traffic.

The P-GW 908 may be notified by the PCRF (via the Gx interface) of polices that indicate which flows require metadata or service path information to be inserted. In some cases, if the P-GW 908 has integrated TDF functionality, the P-GW 908 may be notified by the PCRF (via the St interface) of polices that indicate which flows require metadata or service path information to be inserted. In an example embodiment, the OAM system may allow the network operator to configure the P-GW 908 to handle NSHs. For example, the OAM system may be used to configure the P-GW 908 with traffic steering policies. The polices may be flow-based, application-based, or user-based.

By way of example, the P-GW 908 receives T-PDU's from the S-GW 906. The T-PDU's are IP packets that will be sent to the (S)Gi-LAN 910. In an example embodiment, the P-GW 908 may append the NSH 901 to the front of the IP packet. In some cases, if the UE 902, eNodeB 904, or S-GW 906 already appended the NSH 901 to the IP packet as described above, then the P-GW 908 may update the NSH 901 by adding metadata to the NSH 901. The P-GW 908 may insert various metadata into an NSH, such as, for example and without limitation, a QoS, a congestion level, or customized values or fields that were provided by the OAM system or the PCRF (via the Gx or St interface). Alternatively, if metadata was embedded in the GTP header, for example, the P-GW 908 may extract the metadata from the GTP header and use it to build the NSH 901. In some cases, if the P-GW 908 adds metadata to the NSH 901, then the P-GW 908 will need to adjust the Len field of the NSH base header accordingly.

Still referring generally to FIG. 9, a Service Classification Function (SCF) may be part of, or co-located with, the P-GW 908 or the TDF. Alternatively, the SCF may be a standalone entity in the (S)Gi-LAN 910. In one example, the SCF accepts IP packets from the P-GW 908 and selects a Service Path ID based on the metadata and policies. The polices may have come to the SCF via an St or Sd interface with the PCRF that allows it to accept traffic steering policies from the MNO. For example, the SCF may use the metadata in the NSH 901 to recognize that the traffic is coming from a congested network, but the flow requires low latency. This may cause the SCF to select a Service Path ID that will steer the traffic through lower latency service functions or fewer service functions to account for any delay that was added in the congested network. It is recognized herein that, as described in "IETF, Network Working Group, Internet-Draft, Service Function Chaining Using MPLS-Spring," which is incorporated by reference as if its contents are set forth herein, MPLS labels may be used to indicate which service path should be used for each traffic flow.

Figure 13:
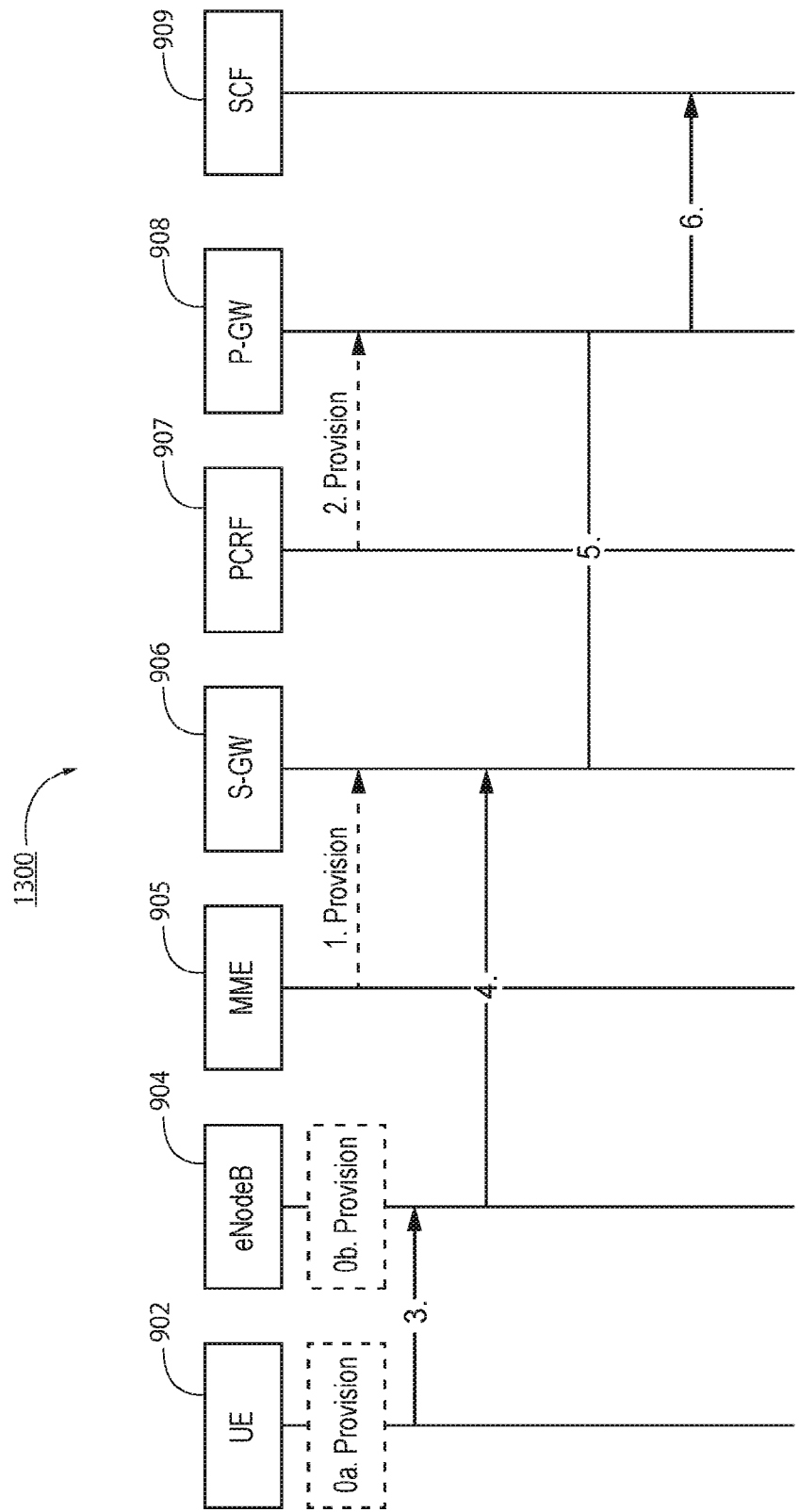
FIG. 13 is a call flow for inserting metadata into uplink traffic in accordance with an example embodiment.

Referring now to FIG. 13, a network 1300 includes the example UE 902, eNodeB 904, an MME 905, S-GW 906, a PCRF 907, P-GW 908, and SCF 909. It will be appreciated that the example network 1300 is simplified to facilitate description of the disclosed subject matter and is not intended to limit the scope of this disclosure. Other devices, systems, and configurations may be used to implement the embodiments disclosed herein in addition to, or instead of, a network such as the network 1300, and all such embodiments are contemplated as within the scope of the present disclosure. It will further be understood that the example network 1300 may be constructed with virtualized network functions. Nodes such as the eNodeB 904, MME 905, S-GW 906, PCRF 907, P-GW 908, and SCF 909 may be virtualized network functions, which are described further herein with reference to FIGS. 15-20. For example, the MME 905 functionality may be provided by a mobility management network function. The S-GW 906 may be provided by a user plane network function. The P-GW 908 may be a user plane network function that serves as an anchor point for a data plane session. In one example, the SCF 909 may use the Service Path Index and Service Path ID to route packets through the appropriate VASs. The service path that is selected for a data flow may be based on the inserted metadata, the user, network conditions, network policies, and the application associated with the data flow. Thus, different data flows from the same UE may be routed through different VASs. For example, a data flow that originated at a capillary network device communicating through the UE 902 may get a different Service Path ID as compared to traffic that originated from an application that is hosted by the UE 902. It will be understood that traffic from capillary network devices may be routed through a different NAT function or handled differently by the NAT function so that the UE and capillary network device traffic may effectively have different IP addresses.

Still referring to FIG. 13, in accordance with the illustrated example, at 0a, the UE 902 may insert a Network Services Header, which can be referred to generally as metadata. As described above, the UE 902 may render a GUI that allows a user of the UE 902 to configure the UE so that the NSH is inserted, or the network may signal to the UE 902 that it should insert the NSH. At 0b, the eNodeB 904 be configured (e.g., via an interface to the OAM system) so that it knows that traffic that is associated with certain traffic flows or users should include a NSH, and so that the eNodeB 904 knows should it add metadata to the NSH. Alternatively, or additionally, the eNodeB 904 may insert metadata or add an NSH based on a NAS request from the UE 902. At 1, the MME 905 may provision the S-GW 906 (via the S11 interface) so that the S-GW 906 knows that traffic that is associated with certain traffic flows or users should include a NSH, and that the S-GW 906 should add metadata to the NSH. Alternatively, the S-GW 906 may know to add metadata to uplink traffic based on configuration information that is received from the OAM system. In some cases, the MME 905 may learn of the NSH requirements from a user's subscription that is obtained from a Home Subscriber Server (HSS) associated with the user. For example, a user's APN configuration may include information such that the MME 905 is informed of which flows or PDN connections require NSH. At 2, as described above, the PCRF 907 may provision the P-GW/TDF (via the Gx or St interface) so that the P-GW 908 knows that traffic that is associated with certain traffic flows, applications, or users should include a NSH, and so that the P-GW 908 knows that it should add metadata to the NSH. Alternatively, the P-GW 908 may know to add metadata based on configuration information that is received from the OAM system.

Still referring to FIG. 13, in accordance with the illustrated example, at 3, the UE may insert an NSH in data flows (e.g., uplink traffic) that originate from certain applications or that are associated with certain traffic flows. The configuration may come from the core network or a GUI, such as the GUI 1000 for example. The UE may create the NSH and/or add metadata as described above. At 4, the eNodeB 904 may insert an NSH in data flows (e.g., uplink traffic) that come from certain users or that is associated with certain traffic flows. The eNodeB 904 may create the NSH and/or add metadata as described above. At 5, the S-GW 906 may insert an NSH in data flows (e.g., uplink traffic) that come from certain users or that are associated with certain traffic flows. The S-GW 906 may create the NSH and/or add metadata as described above. At 6, in accordance with the illustrated example, the P-GW 908 inserts an NSH in data flows (e.g., uplink traffic) that come from certain users, applications, or that is associated with certain traffic flows. The P-GW may create the NSH and/or add metadata as described above. The NSH and associated meta data may then be used by the SCF to make traffic steering decisions. In the example depicted by FIG. 13, the SCF is a user plane function and may be implemented as a virtualized core network function. The SCF may also be a control plane function and may be implemented as a virtualized core network function. If the SCF is implemented as a control plane function, it may receive the meta data from a single network function, such as the P-GW in a control plane message for example, or it may receive the metadata from multiple network functions and the UE in separate control messages. The SCF may then send its traffic steering decisions, or policies, to the UE, other network functions, or value added services. Thus, a given UE may receive a control plane message indicating that metadata may be provided to the network.

FIGS. 9 and 13 and the description related thereto illustrate various embodiments of methods and apparatus for inserting "steering" metadata into uplink messages. In these figures, various steps or operations are shown being performed by one or more nodes, apparatuses, functions, or networks. For example, the apparatuses may operate singly or in combination with each other to effect the methods described herein. As used herein, the terms apparatus, network apparatus, node, device, entity, and network node may be used interchangeably. It is understood that the nodes, apparatuses, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 14A or 14B described below. That is, the methods illustrated in FIGS. 9 and 13 may be implemented in the form of software (e.g., computer-executable instructions) stored in a memory of a network node, such as for example the node or computer system illustrated in FIG.

14C or 14D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 14C and 14D, respectively) of the node under control of the processor of the node and the computer-executable instructions (e.g., software) that it executes.

Figure 14A:
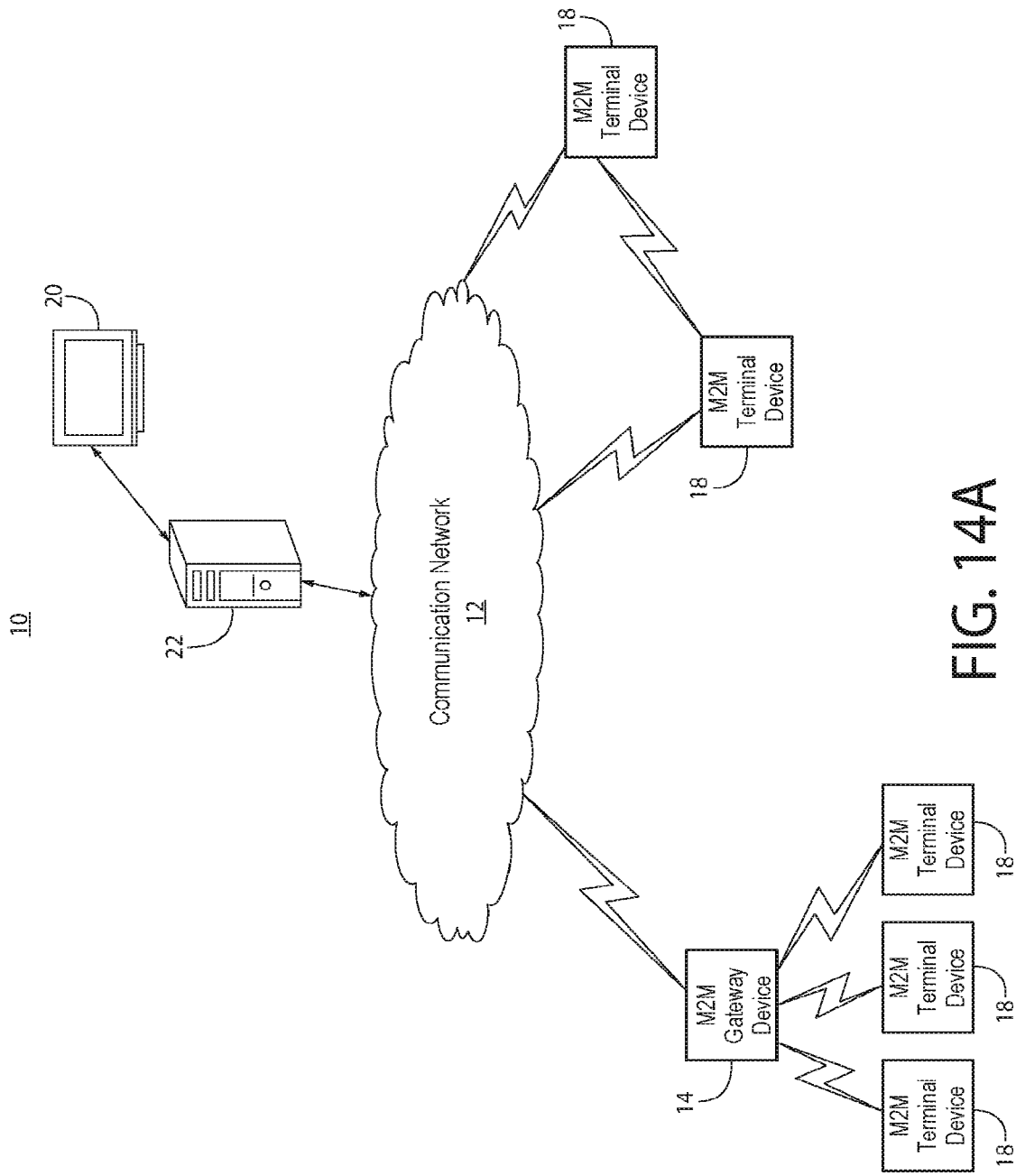
FIG. 14A is a system diagram of an example machine-to-machine (M2M) or Internet of Things (IoT) communication system in which one or more disclosed embodiments may be implemented.

FIG. 14A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the devices, functions, nodes, or networks illustrated in any of FIGS. 9-13 may comprise a node of a communication system such as the one illustrated in FIGS. 14A-D.

As used herein, the term service layer refers to a functional layer within a network service architecture. Service layers are typically situated above the application protocol layer such as HTTP, CoAP or MQTT, and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies (e.g., oneM2M) have been developing M2M service layers to address the challenges associated with the integration of M2M types of devices and applications into deployments such as the Internet/Web, cellular, enterprise, and home networks. An M2M service layer can provide applications and/or various devices with access to a collection of, or a set of, the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs that make use of message formats, resource structures, and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 14B:
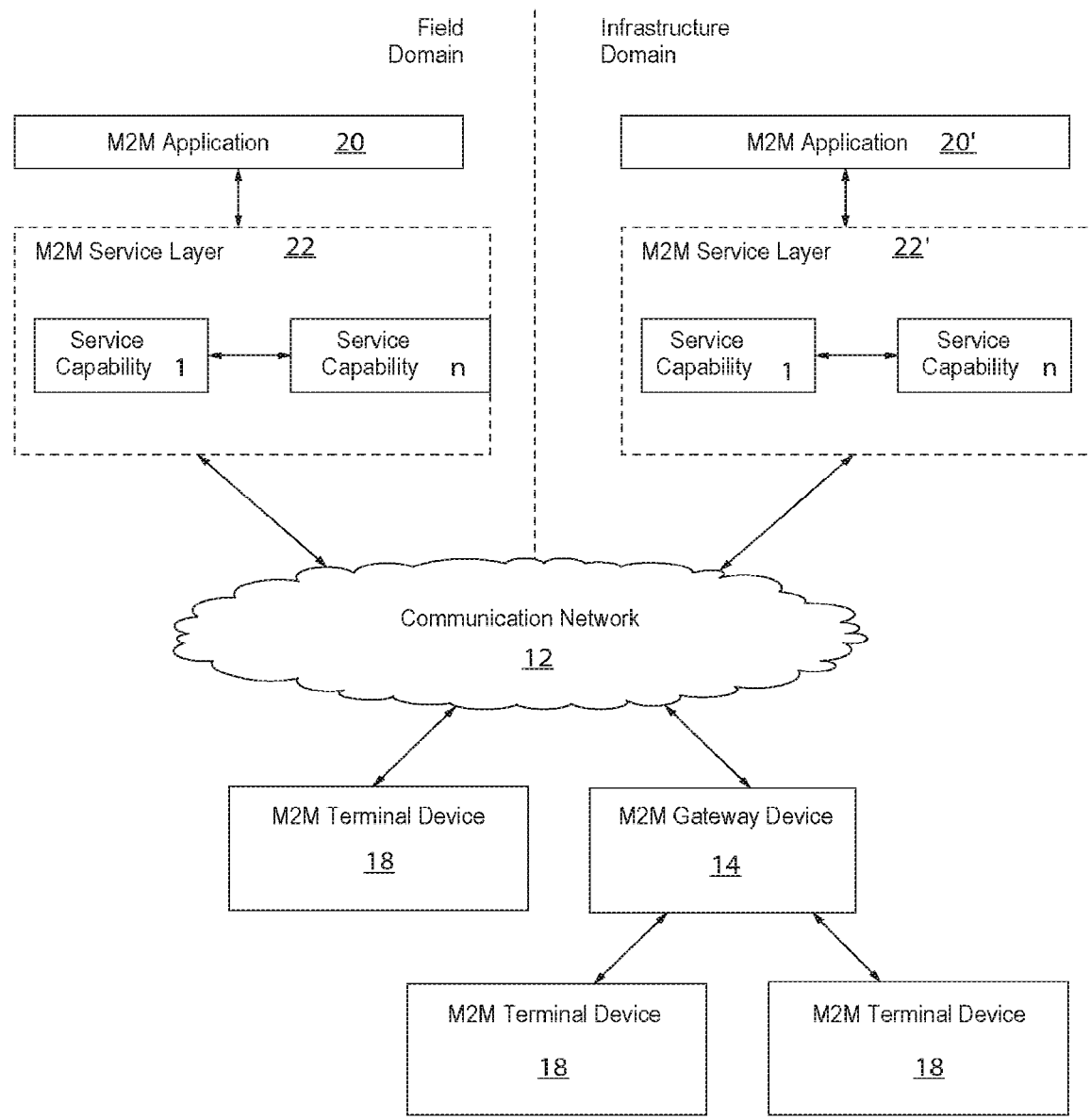
FIG. 14B is a system diagram of an example architecture that may be used within the M2M/IoT communications system illustrated in FIG. 14A.

Referring to FIG. 14B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 14B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 14A and 14B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 14C or 14D described below.

Further, the methods and functionalities described herein may be implemented as part of an M2M network that uses a Service Oriented Architecture (SOA) and/or a resource-oriented architecture (ROA) to access services.

Figure 14C:
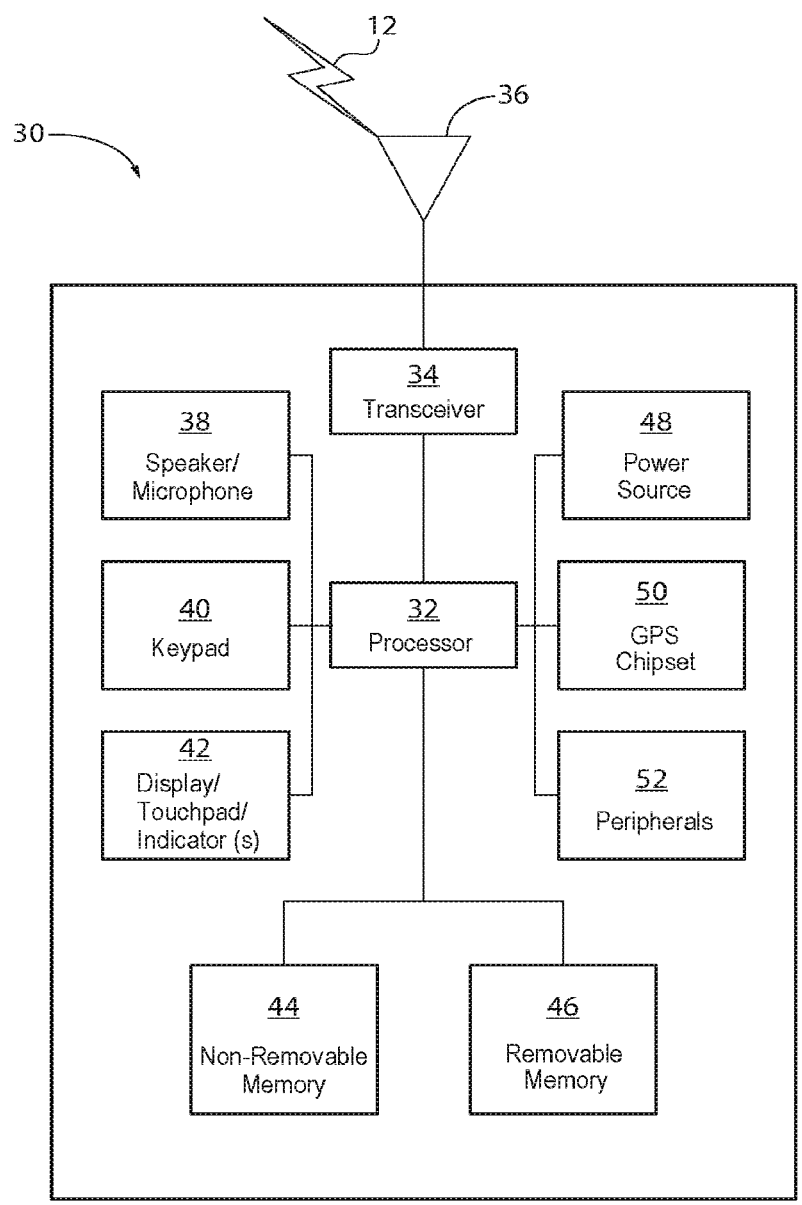
FIG. 14C is a system diagram of an example M2M/IoT terminal or gateway device that may be used within the communications system illustrated in FIG. 14A.

FIG. 14C is a block diagram of an example hardware/software architecture of a node or apparatus of a network, such as one of the nodes, devices, functions, or networks illustrated in FIGS. 9-13 which may operate as an M2M server, gateway, device, or other node in an M2M network such as that illustrated in FIGS. 14A and 14B. As shown in FIG. 14C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the metadata insertions and traffic steering related thereto described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 14C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 9-13) and in the claims. While FIG. 14C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATS, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node a UE (e.g., FIGS. 10 and 11), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14D:
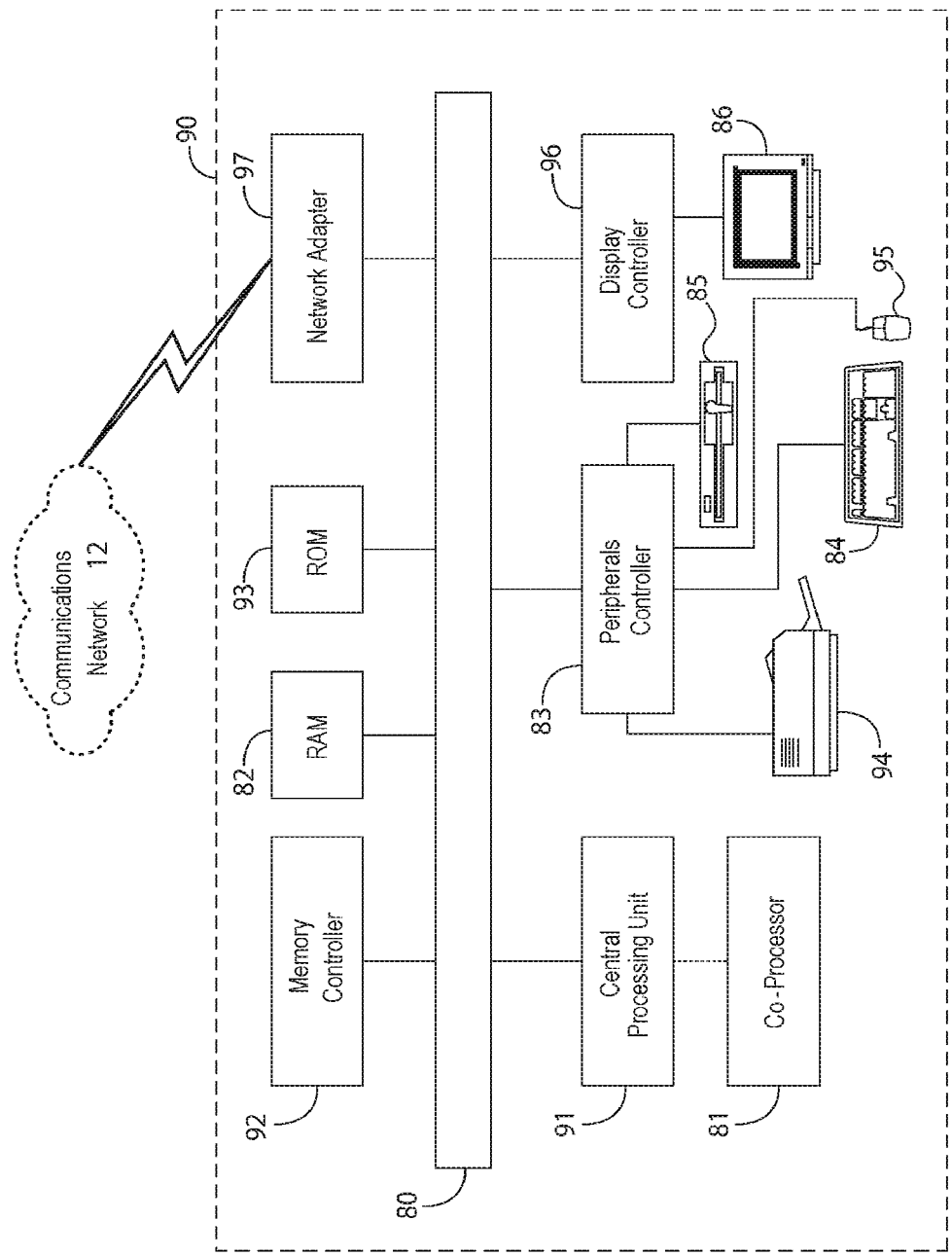
FIG. 14D is a block diagram of an example computing system in which aspects of the communication system of FIG. 14A may be embodied.

FIG. 14D is a block diagram of an exemplary computing system 90 which may also be used to implement one or more nodes of a network, such as nodes, devices, functions, or networks illustrated in FIGS. 9-13, which may operate as an M2M server, gateway, device, or other node in an M2M network such as that illustrated in FIGS. 14A and 14B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for steering traffic.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 14A and FIG. 14B, to enable the computing system 90 to communicate with other nodes of the network. The communication circuitry, alone or in combination with the CPU 91, may be used to perform the transmitting and receiving steps described herein (e.g., in FIG. 13) and in the claims.

Figure 15:
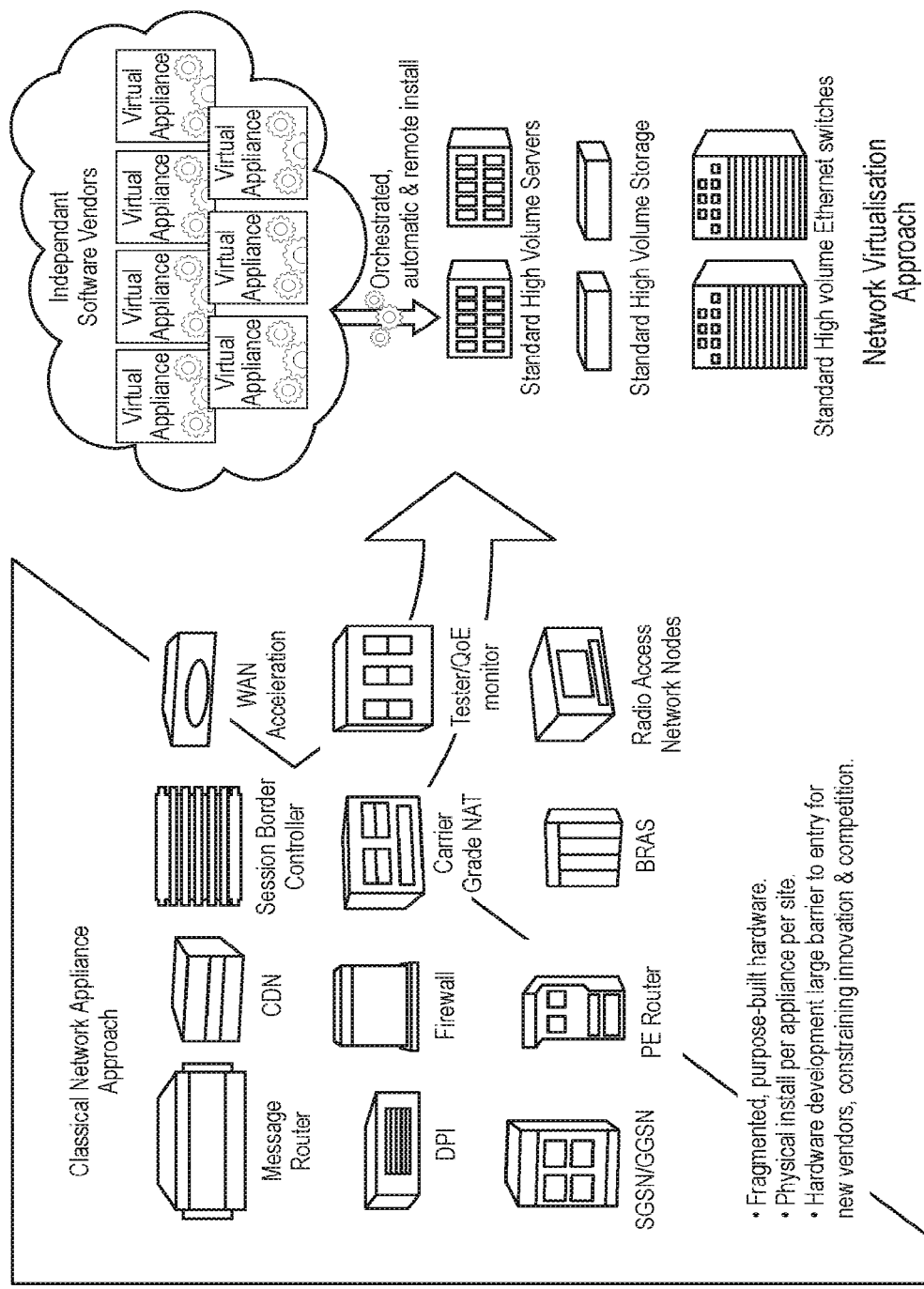
FIG. 15 is a diagram that illustrates an example architecture framework for Network Functions Virtualization (NFV), in which one or more disclosed embodiments may be implemented.

Referring now to FIG. 15, as mentioned above, further details related to Network Functions Virtualization (NFV) is provided, as embodiments described herein may be implemented by NFV. By way of background, NFV aims to transform the way that network operators architect networks. In particular, IT virtualization technology is being used to consolidate many network equipment types onto industry standard high volume servers, switches and storage, which can be located in data centers, network nodes, and in the end user premises. Network functions (e.g., mobility management, session management, QoS) can be implemented in software, and the network functions can run on a range of industry standard server hardware. The functions can be moved to, or instantiated in, various locations in the network as required, without the need for installation of new equipment. FIG. 15 illustrates one example of an architectural framework for NFV that has been provided by ETSI.

It is recognized herein that NFV may be applied to any data plane packet processing and control plane function in mobile and fixed networks. Examples include, presented without limitation:
  Switching elements (e.g., BNG, CG-NAT, routers)
  Mobile network nodes (e.g., HLR/HSS, MME, SGSN, GGSN/PDN-GW, RNC, eNodeB)
  Functions contained in home routers and set top boxes to create virtualized home environments
  Converged and network-wide functions (e.g., AAA servers, policy control, and charging platforms
  Application-level optimization (e.g., CDNs, Cache Servers, Load Balancers, Application Accelerators)
  Security functions (e.g., firewalls, virus scanners, intrusion detection systems, Spam protection It is recognized herein that applying NFV may provide various benefits to network operators, which may contribute to dramatic changes in the telecommunications industry landscape. For example, and without limitation, it is recognized herein that NFV may provide for:
  Reduced equipment costs and reduced power consumption through consolidating equipment and exploiting the economies of scale of the IT industry.
  Increased velocity of Time to Market by minimizing the typical network operator cycle of innovation.
  The possibility of running production, test and reference facilities on the same infrastructure provides more efficient testing and integration, reducing development costs and time to market.
  Targeted service introduction based on geography or customer sets. Services can be rapidly scaled up/down as required.
  The enablement of a wide variety of eco-systems (encouraging openness).
  Optimized network configuration and/or topology in near real time based on the actual traffic/mobility patterns and service demand.
  The support of multi-tenancy, thereby allowing network operators to provide tailored services and connectivity for multiple users, applications, internal systems, or other network operators, which may co-existing on the same hardware with appropriate secure separation of administrative domains.
  Reduced energy consumption by exploiting power management features in standard servers and storage, as well as workload consolidation and location optimization.

The European Telecommunications Standards Institute (ETSI) has formed a specification group ("Network Functions Virtualization") to publish white papers, and to produce several more in-depth materials, including standard terminology definitions and use cases for NFV that act as references for vendors and operators who are considering implementing NFV.

Figure 16:
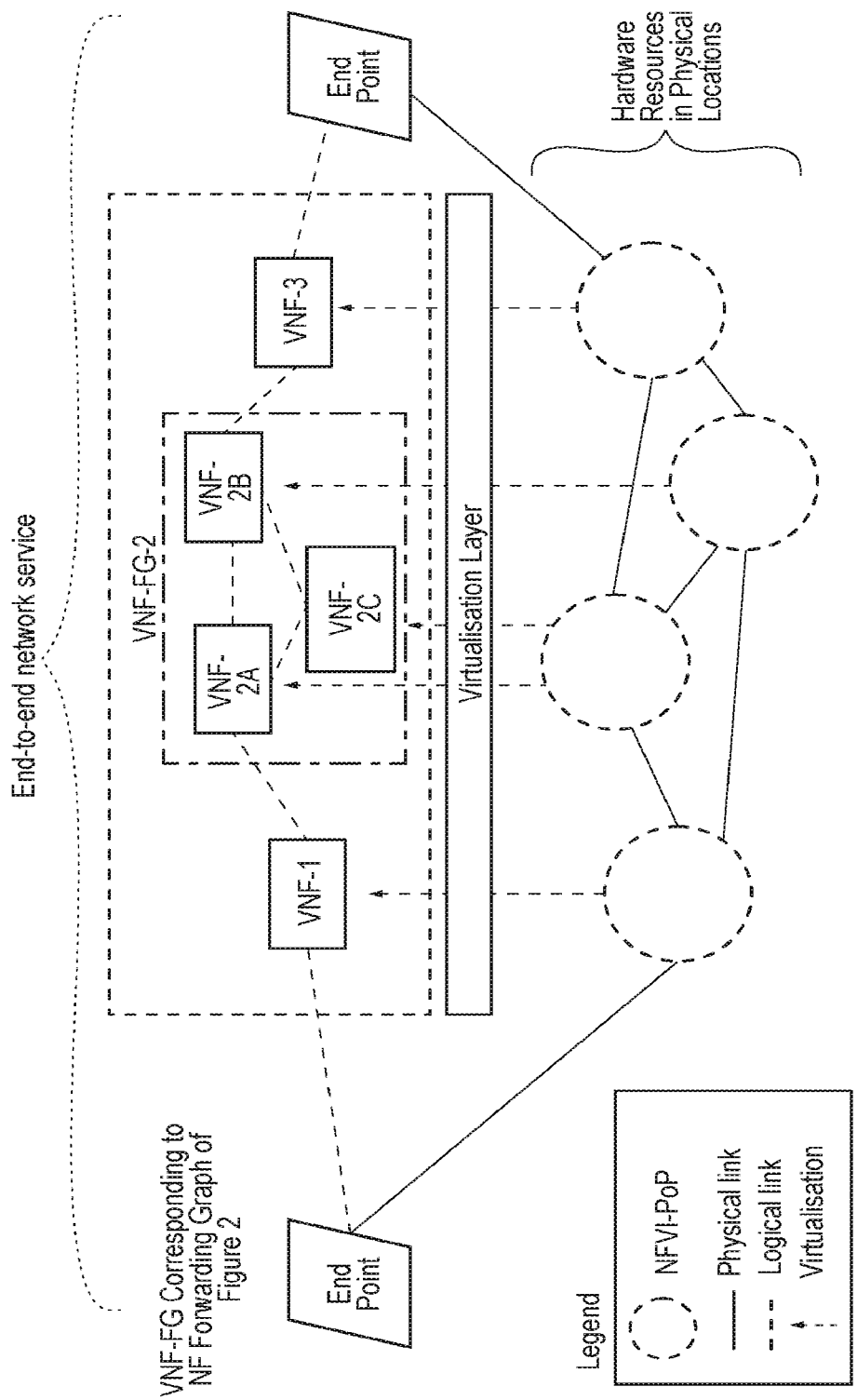
FIG. 16 is a diagram that illustrates an example of a Virtualized Network Function Forwarding Graph (VNF-FG)

FIG. 16 is an example (from ETSI GS NFV 002) of an end-to-end Network Service with VNFs and nested forwarding graphs. FIG. 16 illustrates the concept of a Virtualized Network Function Forwarding Graph (VNF-FG). A VNF-GW describes how a set of VNF's are connected to provide a service.

Figure 17:
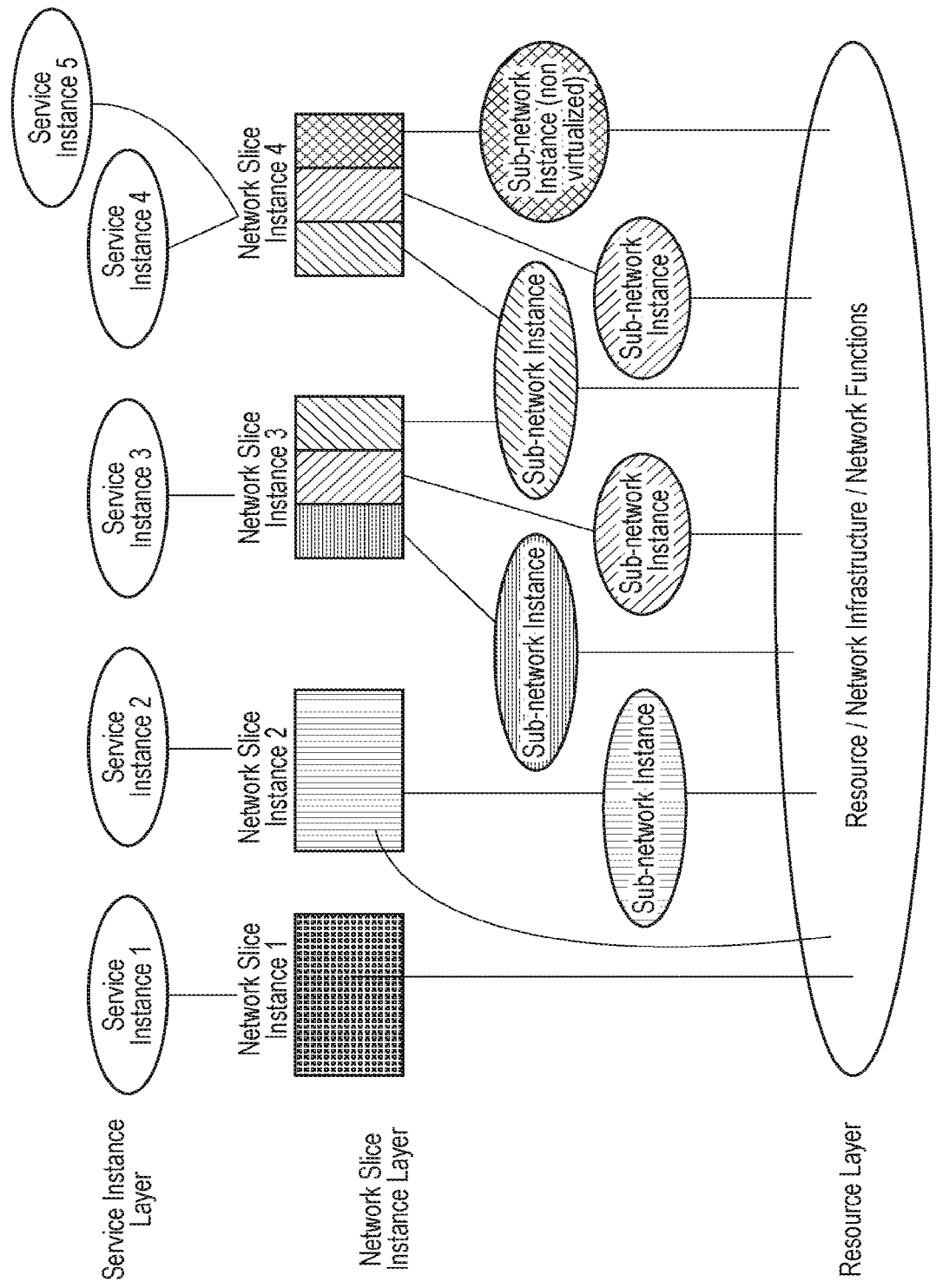
FIG. 17 is a diagram that illustrates an example architecture for network slicing, in which one or more disclosed embodiments may be implemented.

Network Slicing, such as described in the Next Generation Mobile Network (NGMN) Alliance, "Description of Network Slicing Concept", is a mechanism that can be used by mobile network operators to support multiple virtual networks behind the air interface across the fixed part of the mobile operator's network (both backhaul and core network). This involves 'slicing' the network into multiple virtual networks to support different RANs or different service types running across a single RAN. Network slicing enables the operator to create networks that are customized to provide optimized solutions for different market scenarios that demand diverse requirements, for example, in the areas of functionality, performance, and isolation. FIG. 17 shows an example conceptual architecture of network slicing. It will be understood that the different types of shading in FIG. 17 indicate the different network slice instances or subnetwork slice instances.

3GPP is designing a 5G network and is considering whether to incorporate the network slicing technology, which may be a good fit for the 5G network because the 5G use cases (e.g., massive IoT, critical communications, and enhanced mobile broadband) demand very diverse and sometimes extreme requirements. The current architecture utilizes a relatively monolithic network and transport framework to accommodate a variety of services, such as, for example, mobile traffic from smart phones, OTT content, feature phones, data cards, and embedded M2M devices. It is anticipated that the current architecture is not flexible and scalable enough to efficiently support a wider range of business need when each has its own specific set of performance, scalability, and availability requirements. Furthermore, it is recognized herein that the introduction of new network services should be made more efficient. Nevertheless, several use cases are anticipated to be active concurrently in the same operator network, thus requiring a high degree of flexibility and scalability of the 5G network.

Figure 18:
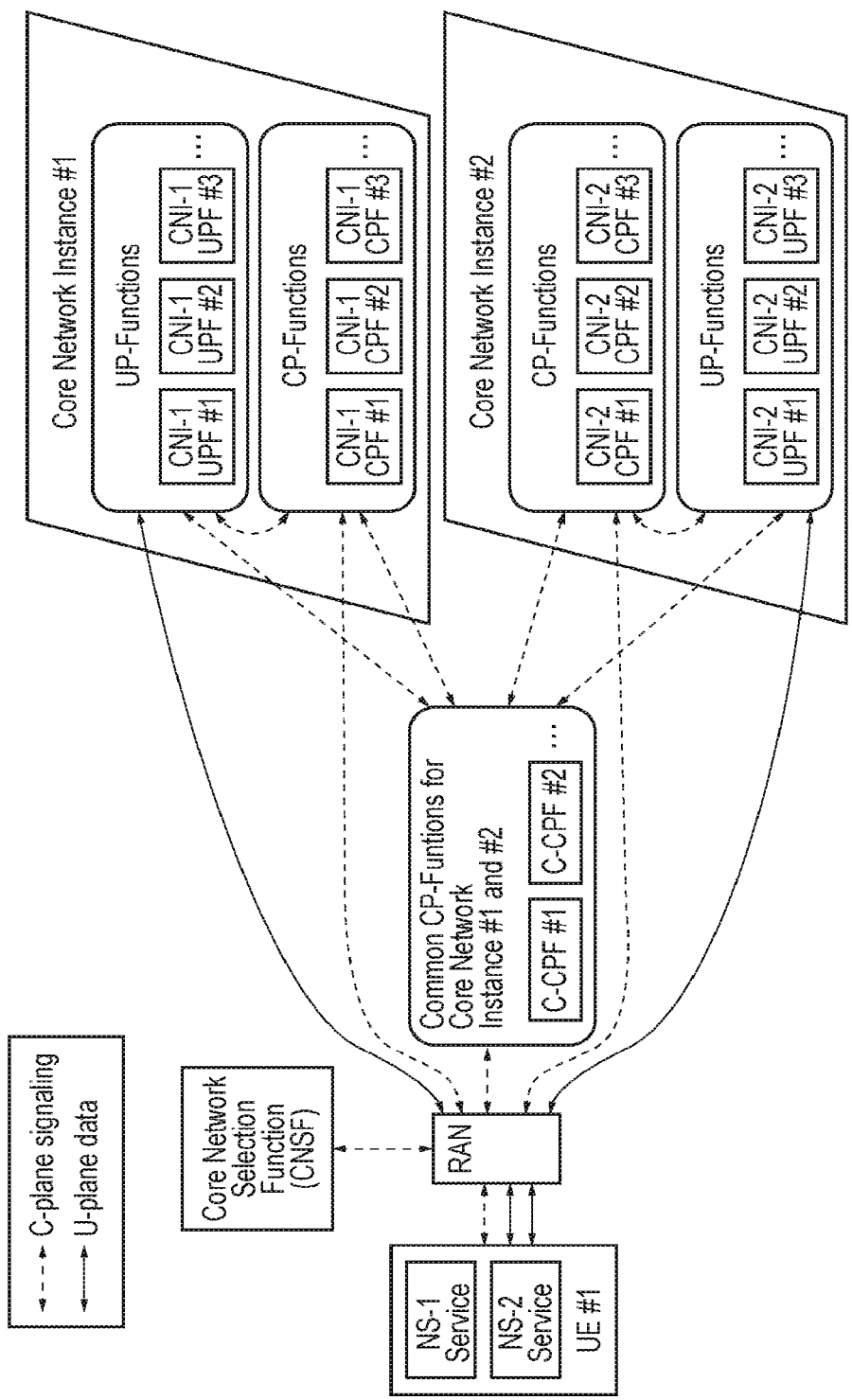
FIG. 18 is a diagram that illustrates an example Core Network Selection Function (CNSF) for selecting multiple network slice instances.

In some cases, to enable a UE to simultaneously obtain services from multiple Network Slices of one network operator, a single set of Control Plane Functions is shared across multiple Core Network Instances, as shown in FIG. 18.

A Core Network Instance consists of a single set of Control Plane Functions and a single set of User Plane Functions. Moreover, a Core Network Instance is dedicated for the UEs that are belonging to the same UE type. Identifying the UE type is done by using a specific parameter, e.g., the UE Usage Type, and/or an information from the UE's subscription. A set of User Plane Functions in a Core Network Instance is responsible for providing a specific service to the UE and for transports the User Plane data of the specific service. For example, one set of User Plane functions in Core Network Instance #1 provides an enhanced mobile broadband service to the UE, whereas another set of User Plane functions in Core Network Instance #2 provides a critical communication service to the UE. When a UE first connects to the operator's Network, a default Core Network Instance that matches to the UE Usage Type is assigned to the UE. Each UE can have multiple User Plane connections to different sets of User Plane Function that are available at different Core Network Instances simultaneously. Control Plane functions may be shared across network slices.

The Core Network Selection Function (CNSF) may have several responsibilities. For example, the CNSF may select which Core Network Instance accommodates the UE, for example, by taking into account the UE's subscription and a specific parameter (e.g., the UE Usage Type). The CNSF may select which Control Plane Functions within the selected Core Network Instance with which the Base Station should communicate. This selection of Control Plane Functions may be done by using the specific parameter (e.g., UE Usage Type). The CNSF may select which set of User Plane Functions with which the Base Station should establish the connection for transporting User Plane data of different services. This selection of User Plane Function is done by using specific parameters (e.g., UE Usage Type and the Service Type).

Figure 19:
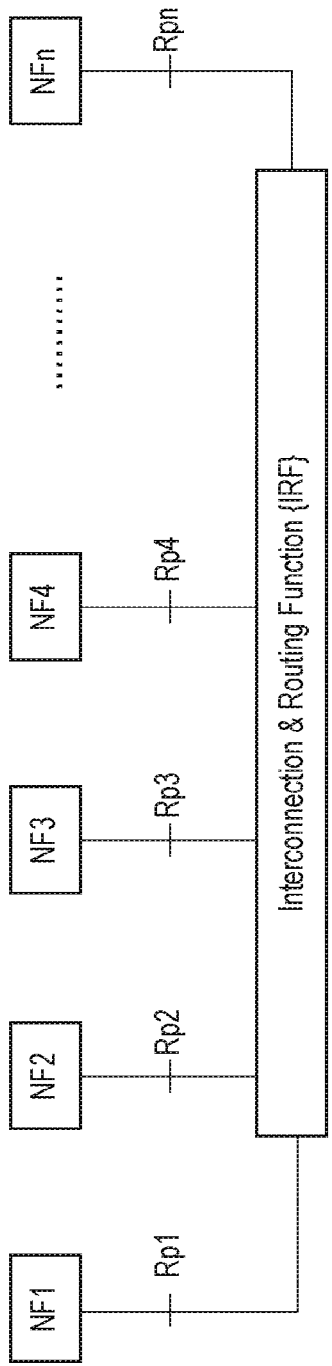
FIG. 19 is a diagram that illustrates an example non-roaming reference model for the interconnection of network functions.
Figure 20:
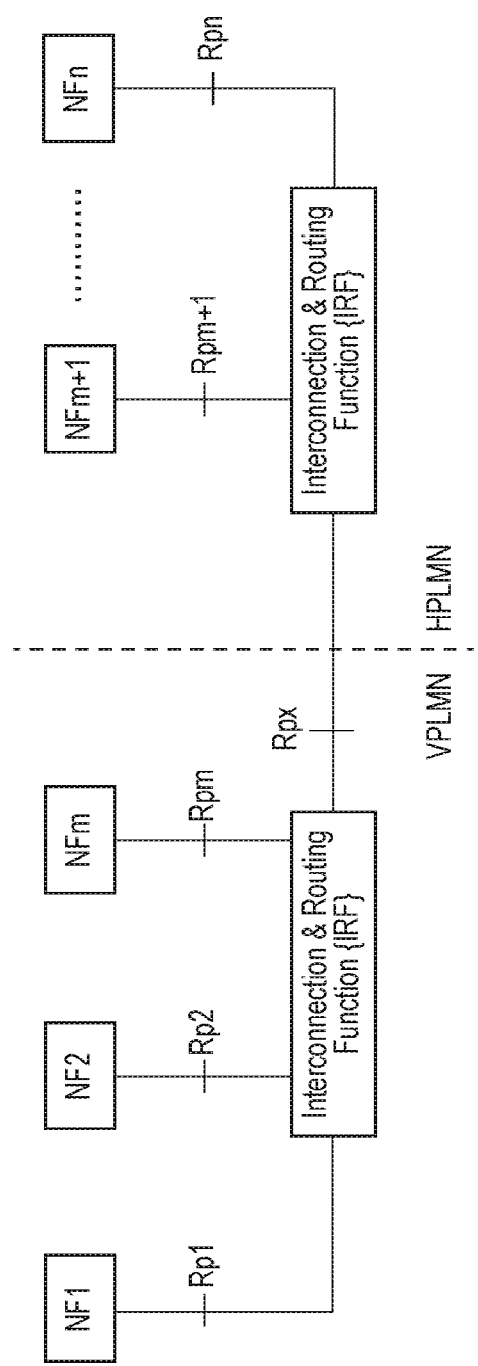
FIG. 20 is a diagram that illustrates a roaming reference model for the interconnection of network functions.

To enable the interconnection of network functions, the Interconnection & Routing Function (IRF) 2058 is proposed in 3GPP TR 23.799, Study on Architecture for Next Generation System. FIG. 19 and FIG. 20 show the reference models of IRF 2058 for non-roaming and roaming scenarios, respectively. The functions of IRF 2058 include, presented by way of example and without limitation:

- Stores the binding between the UE's identity and the interface layer identity (e.g., instance number) of each serving NF, which has an active session for the UE. For the NFs that do not interface with the IRF 2058 directly, e.g. in roaming scenario, the IRF 2058 stores the identity of the remote-PLMN's IRF 2058 via which of those NFs are reachable.
- Updates the binding repository when the identity of the serving NF changes for a given UE (e.g., due to UE mobility, load re-balancing or scale-in or scale-out of virtual machines or restoration reasons).
- Examines the message header to determine the identity of the UE (for which the message is sent) and the destination NF. For the UE's identity, the IRF looks up the internal binding repository to determine the interface layer identity (e.g., instance number) of the destination NF or the identity of the remote IRF 2058, and then routes the message accordingly.
- Optionally performs authorization of the message based on the operator's configuration. For example, if the operator's configuration prohibits NF1 from sending a certain message (e.g., such as "change of UE's APN-AMBR") toward NF4, then the IRF 2058 rejects the corresponding message. In some cases, the IRF optionally protects NFs during a signaling storm by performing overload control (e.g., pacing of messages sent to a given NF based on its load/overload condition).

Each NF interfaces with the IRF 2058 via a given reference point in its own PLMN. In some cases, as shown, the NFs do not interface with each other directly but can communicate (e.g., send request or response messages) with each other via the IRF 2058. Thus, when required, this model allows any NF to communicate with any other NF directly without involving any other unrelated network functions in the path. For example, as shown, the NF1-31 can send a message to the NF3 via IRF 2058 without involving the NF2 (e.g., if the involvement of NF2 is not needed).

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

The following is a list of acronyms relating to service technologies that may appear in the above description. Unless otherwise specified, the acronyms used herein refer to the corresponding term listed below.

| | |
|---|---|
| DPI | Deep Packet Inspection |
| GGSN | Gateway GPRS Support Node |
| GPRS | General Packet Radio Service |
| GTP | GPRS Tunnel Protocol |
| HTTP | Hyper Text Transfer Protocol |
| LAN | Local Access Network |
| MCN | Mobile Core Network |
| MNO | Mobile Network Operator |
| NAT | Network Address Translation |
| NSH | Network Services Header |
| PCRF | Policy and Charging Rules Function |
| P-GW | PDN Gateway |
| SFC | Service Function Chaining |
| SFF | Service Function Forwarder |
| (S)Gi-LAN | LAN between the GGSN/P-GW and the Internet |
| S-GW | Serving Gateway |
| SPI | Service Path ID |
| TCP | Transmission Control Protocol |
| TLV | Type, Length, Value |
| TDF | Traffic Detection Function |
| VAS | Value Added Services |

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed is:

1. A user equipment (UE) comprising a processor, a memory, and communication circuitry, the UE being connected to a network via its communication circuitry, the UE further comprising computer-executable instructions stored in the memory of the UE which, when executed by the processor of the UE, cause the UE to perform operations comprising:

receive a first message, wherein the first message comprises a non-access stratum (NAS) message that indicates that the UE is to send metadata to the network for a specified traffic flow, wherein the NAS message comprises packet filter information used to identify the specified traffic flow for which the UE is to send the metadata;

insert metadata in one or more second messages, the metadata comprising information associated with the specified traffic flow, wherein the metadata comprises a first metric comprising a radio access technology (RAT) type information and a second metric comprising information indicative of a connection quality; and send the one or more second messages with the metadata to a user plane function associated with the network, wherein the metadata is sent over the user plane.

2. The UE as recited in claim 1, wherein the metadata is indicative of a status, and the status indicates at least one preference of the UE.

3. The UE as recited in claim 1, wherein the at least one of the first metric and the second metric further comprises a communication schedule or a power restriction.

4. The UE as recited in claim 1, wherein the UE is configured via a graphical user interface to allow certain applications to send metadata to the network or to allow certain types of metadata to be sent to the network.

5. The UE as recited in claim 1, wherein at least one of the first metric and the second metric further comprises a battery level.

6. The UE as recited in claim 1, wherein at least one of the first and the second metric further comprises an active timer, a periodic tracking area update (TAU) timer, a DRX cycle length, a sleep schedule, a location, or a caching policy.

7. A method comprising:
receiving a first message, wherein the first message comprises a non-access stratum (NAS) message that indicates that a user equipment (UE) is to send metadata to a network for a specified traffic flow, wherein the NAS message comprises packet filter information used to identify the specified traffic flow for which the UE is to send the metadata;

inserting metadata in one or more second messages, the metadata comprising information associated with the specified traffic flow, wherein the metadata comprises a first metric comprising a radio access technology (RAT) type information and a second metric comprising information indicative of a connection quality; and sending the one or more second message with the metadata to a user plane function associated with the network, wherein the metadata is sent over the user plane.

8. The method as recited in claim 7, wherein the metadata is indicative of a status, and the status indicates at least one preference of the UE.

9. The method as recited in claim 7, wherein the at least one of the first metric and the second metric further comprises a communication schedule or a power restriction.

10. The method as recited in claim 9, wherein the NAS message is based on at least one of a Traffic Flow Template (TFT) information element of a session management message or a protocol configuration options information element of an EP session management message.

11. The method as recited in claim 1, wherein the NAS message is based on at least one of a Traffic Flow Template (TFT) information element of a session management message or a protocol configuration options information element of a session management message.

12. The method as recited in claim 7, wherein the UE is configured via a graphical user interface to allow certain applications to send metadata to the network or to allow certain types of metadata to be sent to the network.

13. The method as recited in claim 7, the method further comprising:
sending uplink traffic with the metadata inside of a tunnel, wherein at least one of the first and second metric further comprises an active timer, a periodic tracking area update (TAU) timer, a DRX cycle length, a sleep schedule, a location, or a caching policy.

14. The method as recited in claim 7, wherein at least one of the first metric and the second metric further comprises status or battery level.

15. A user equipment (UE) comprising a processor, the processor configured to:
receive a first message, wherein the first message comprises a non-access stratum (NAS) message that indicates that the UE is to send connection related information to a network, the connection related information comprising information used for evaluating connection quality for a specified traffic flow and radio access technology (RAT) type information, wherein the NAS message comprises packet filter information associated with the specified traffic flow for which the UE is to send the information used for evaluating connection quality;

insert information used for evaluating connection quality for the specified traffic flow into at least a second message;

insert the RAT type information into at least a third message; and send the second message comprising the information used for evaluating connection quality for the specified traffic flow and third message comprising the RAT type information to a user plane function associated with the network, wherein the second message and the third message are sent over the user plane.

16. The UE of claim 15, wherein the NAS message comprises a session management message.

17. The UE of claim 15, wherein the specified traffic flow is associated with a network slice.

* * * * *

UNITED STATES PATENT AND TRADEMARK OFFICE
CERTIFICATE OF CORRECTION

PATENT NO. : 12,244,490 B2
APPLICATION NO. : 17/181812
DATED : March 4, 2025
INVENTOR(S) : Michael F. Starsinic, Ahmed Mohamed and Qing Li Page 1 of 1

It is certified that error appears in the above-identified patent and that said Letters Patent is hereby corrected as shown below:

In the Claims

In Claim 6: Column 25, Line 31, delete "first and the second metric further comprises an active timer," and insert -- first metric and the second metric further comprises an active timer, --.

Signed and Sealed this
Twenty-seventh Day of May, 2025

Coke Morgan Stewart
*Acting Director of the United States Patent and Trademark Office*